United States Patent
Ye et al.

(10) Patent No.: US 10,717,790 B2
(45) Date of Patent: Jul. 21, 2020

(54) CATALYST COMPOSITION COMPRISING FLUORIDED SUPPORT AND PROCESSES FOR USE THEREOF

(71) Applicant: ExxonMobil Chemical Patents Inc., Baytown, TX (US)

(72) Inventors: Xuan Ye, Houston, TX (US); Matthew W. Holtcamp, Huffman, TX (US); Laughlin G. McCullough, League City, TX (US); Jo Ann M. Canich, Houston, TX (US); David F. Sanders, Beaumont, TX (US); Gregory S. Day, College Station, TX (US); Michelle E. Titone, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/565,624

(22) PCT Filed: Mar. 10, 2016

(86) PCT No.: PCT/US2016/021751
§ 371 (c)(1),
(2) Date: Oct. 10, 2017

(87) PCT Pub. No.: WO2016/171808
PCT Pub. Date: Oct. 27, 2016

(65) Prior Publication Data
US 2018/0072823 A1    Mar. 15, 2018

Related U.S. Application Data

(60) Provisional application No. 62/149,814, filed on Apr. 20, 2015.

(30) Foreign Application Priority Data

Jun. 25, 2015  (EP) .................................... 15173732

(51) Int. Cl.
| | |
|---|---|
| C08F 4/02 | (2006.01) |
| C08F 4/6592 | (2006.01) |
| C08F 210/16 | (2006.01) |
| B01J 31/22 | (2006.01) |
| C08F 210/14 | (2006.01) |
| C08F 4/659 | (2006.01) |

(52) U.S. Cl.
CPC ......... *C08F 4/6592* (2013.01); *B01J 31/2295* (2013.01); *C08F 4/02* (2013.01); *C08F 4/025* (2013.01); *C08F 210/14* (2013.01); *C08F 210/16* (2013.01); *C08F 4/65912* (2013.01); *C08F 4/65916* (2013.01); *C08F 2420/02* (2013.01); *C08F 2500/10* (2013.01)

(58) Field of Classification Search
CPC .... C08F 4/02; C08F 4/65912; C08F 4/65916; C08F 210/16
See application file for complete search history.

(56) References Cited

U.S. PATENT DOCUMENTS

| | | | |
|---|---|---|---|
| 4,701,432 A | 10/1987 | Welborn, Jr. | |
| 5,077,255 A | 12/1991 | Welborn, Jr. | |
| 5,135,526 A | 8/1992 | Zinnanti et al. | |
| 5,382,630 A | 1/1995 | Stehling et al. | |
| 5,382,631 A | 1/1995 | Stehling et al. | |
| 5,516,848 A | 5/1996 | Canich et al. | |
| 5,965,756 A | 10/1999 | McAdon et al. | |
| 6,069,213 A | 5/2000 | Nemzek et al. | |
| 6,175,409 B1 | 1/2001 | Nielsen et al. | |
| 6,207,606 B1 | 3/2001 | Lue et al. | |
| 6,260,407 B1 | 7/2001 | Petro et al. | |
| 6,294,388 B1 | 9/2001 | Petro | |
| 6,310,164 B1 | 10/2001 | Morizono et al. | |
| 6,406,632 B1 | 6/2002 | Safir et al. | |
| 6,420,507 B1 | 7/2002 | Kale et al. | |
| 6,436,292 B1 | 8/2002 | Petro | |
| 6,444,764 B1 | 9/2002 | Kristen et al. | |
| 6,451,724 B1 | 9/2002 | Nifant'ev et al. | |
| 6,454,947 B1 | 9/2002 | Safir et al. | |
| 6,461,515 B1 | 10/2002 | Safir et al. | |
| 6,475,391 B2 | 11/2002 | Safir et al. | |
| 6,491,816 B2 | 12/2002 | Petro | |
| 6,491,823 B1 | 12/2002 | Safir et al. | |
| 6,613,713 B2 | 9/2003 | Becke et al. | |
| 6,646,071 B1 | 11/2003 | Klosin et al. | |
| 6,656,866 B2 | 12/2003 | Wenzel et al. | |

(Continued)

FOREIGN PATENT DOCUMENTS

| | | |
|---|---|---|
| EP | 2374822 A | 10/2011 |
| WO | 98/06727 A | 2/1998 |

(Continued)

OTHER PUBLICATIONS

U.S. Appl. No. 15/145,320, filed May 3, 2016, "Tetrahydro-as-indacenyl Catalyst Composition, Catalyst System, and Processes for Use Thereof".

Amaya, et al., "Sumanenly Metallocenes: Synthesis and Structure of Mono- and Trinuclear Zirconocene Complexes," Journal of the American Chemical Society, 2014, vol. 136 (36), pp. 12794-12798.

Busico, et al., "Effects of Regiochemical and Sterochemical Erros on the Course of Isotactic Propene Polyinsertion Promoted by Homogenous Ziegler—Natta Catalysts," Macromolecules, 1994, vol. 27,No. 26, pp. 7538-7543.

Grassi, et al., "Microstructure of Isotactic Polypropylene Prepared with Homogeneous Catalysis: Steroregularity, Regioregularity, and 1,3-Insertion", 1988, vol. 21, pp. 617-622.

(Continued)

*Primary Examiner* — Caixia Lu

(57) ABSTRACT

This invention relates to a catalyst system including fluorided silica, alkylalumoxane activator and a bridged monocyclopentadienyl group 4 transition metal compound, where the fluorided support has not been calcined at a temperature of 400° C. or more, and is preferably, produced using a wet mix method, particularly an aqueous method.

25 Claims, 5 Drawing Sheets

(56) References Cited

U.S. PATENT DOCUMENTS

| | | |
|---|---|---|
| 6,664,348 B2 | 12/2003 | Speca |
| 6,846,770 B2 | 1/2005 | Speca |
| 7,115,761 B2 | 10/2006 | Resconi et al. |
| 7,141,632 B2 | 11/2006 | Vaughan et al. |
| 7,192,902 B2 | 3/2007 | Brinen et al. |
| 7,214,745 B2 | 5/2007 | Arai et al. |
| 7,355,058 B2 | 4/2008 | Luo et al. |
| 7,385,015 B2 | 6/2008 | Holtcamp |
| 8,088,867 B2 | 1/2012 | Jiang et al. |
| 8,110,518 B2 | 2/2012 | Marin et al. |
| 8,575,284 B2 | 11/2013 | Luo et al. |
| 8,598,061 B2 | 12/2013 | Yang et al. |
| 8,815,357 B1 | 8/2014 | Inn et al. |
| 9,193,856 B2 | 11/2015 | Ebata et al. |
| 2001/0051698 A1* | 12/2001 | Speca ............... C08F 4/65916 526/133 |
| 2002/0007023 A1 | 1/2002 | McDaniel et al. |
| 2003/0088038 A1* | 5/2003 | Vaughan ............... C08F 10/00 526/114 |
| 2004/0214953 A1 | 10/2004 | Yamada et al. |
| 2004/0259722 A1 | 12/2004 | Wang |
| 2005/0288461 A1 | 12/2005 | Jensen et al. |
| 2008/0287620 A1 | 11/2008 | Ravishankar |
| 2009/0239999 A1* | 9/2009 | Canich ............... C08F 10/06 525/55 |
| 2012/0130032 A1 | 5/2012 | Hussein et al. |
| 2014/0031504 A1 | 1/2014 | Jacobsen et al. |
| 2014/0213734 A1 | 7/2014 | Jiang |
| 2014/0242314 A1 | 8/2014 | Inn et al. |
| 2016/0244535 A1 | 8/2016 | Canich et al. |

FOREIGN PATENT DOCUMENTS

| | | |
|---|---|---|
| WO | 98/09999 A | 3/1998 |
| WO | 98/27103 A | 6/1998 |
| WO | 00/12565 A | 3/2000 |
| WO | 01/42315 A | 6/2001 |
| WO | 02/060957 A | 8/2002 |
| WO | 03/025027 A | 3/2003 |
| WO | 2004/013149 A | 2/2004 |
| WO | 2004/046214 A | 6/2004 |
| WO | 2005/075525 A | 8/2005 |
| WO | 2007/080365 A | 7/2007 |
| WO | 2009/146167 A | 12/2009 |
| WO | 2012/006272 A | 1/2012 |
| WO | 2015/009474 A | 1/2015 |
| WO | 2015/067582 A | 5/2015 |
| WO | 2016/114914 A | 7/2016 |
| WO | 2016/114915 A | 7/2016 |
| WO | 2016/114916 A | 7/2016 |
| WO | 2016/171807 A | 10/2016 |
| WO | 2016/171808 A | 10/2016 |
| WO | 2016/172099 A | 10/2016 |
| WO | 2017/034680 A | 3/2017 |

OTHER PUBLICATIONS

Hong, et al., "Immobilized $Me_2Si(C_5Me_4)(N-t-Bu)TiCl_2$/$(nBuCp)_2ZrCl_2$ Hybrid Metallocene Catalyst System for the Production of Poly(ethylene-co-hexene) With Pseudo-Bimodal Molecular Weight and Inverse Comonomer Distribution"; Polymer Engineering and Science, 2007, pp. 131-139.

Iedema, et al., "Predicting the Molecular Weight Distribution of Polyethylene for Mixed Systems with a Constrained-Geometry Metallocene Catalyst in a Semibatch Reactor," Industrial & Engineering Chemistry Research, 2004, vol. 43, pp. 36-50.

Kim, et al., "Copolymerization of Ethylene and α-Olefins with Combined Metallocene Catalysts, III. Production of Polyolefins with Controlled Microstructres," Journal of Polymer Science; Part A: Polymer Chemistry, 2000, vol. 38, pp. 1427-1432.

Kociolek, et al., "Intramolecular Thermal Cyclotrimerization of an Acyclic Triyne: An Uncatalyzed Process," Tetrahedron Letters, 1999, vol. 40, pp. 4141-4144.

Mironov, et al., "Effect of Chlorosilyl Groups on the Liability of Chlorine in (2-Chloroalkyl) Silanes in the Reaction of Dehydrochlorination with Quinoline," N.D. Zelinskii Institute of Organic Chemistry Academy of Sciences USSR, 1957, pp. 1188-1194.

* cited by examiner

Analyzed as EH

Results

| | | | | | | | |
|---|---|---|---|---|---|---|---|
| Mass recovery | 101% | | SCB Wt% (C6) | 6.72% | | LCB g' (Vis Avg) | 0.963 |
| Mn (IR) | 17422 g/mol | | Mn (LS) | 17598 g/mol | | Mn (Vis) | 19473 g/mol |
| Mw (IR) | 98711 g/mol | | Mw (LS) | 102998 g/mol | | Mw (Vis) | 99923 g/mol |
| Mz (IR) | 251710 g/mol | | Mz (LS) | 238536 g/mol | | Mz (Vis) | 286538 g/mol |
| Mw/Mn (IR) | 5.67 g/mol | | | | | IV Bulk | 1.43 dL/g |

Figure 5. TREF of LLDPE produced with supported catalyst C in Example 2
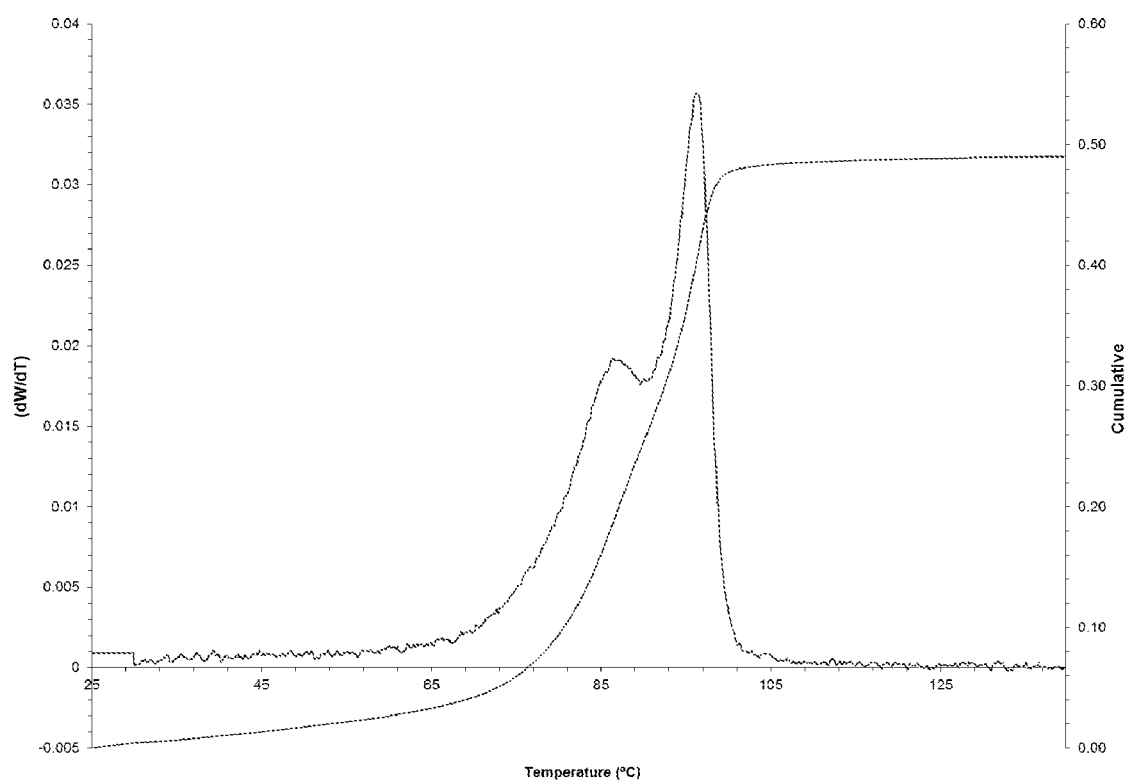

CATALYST COMPOSITION COMPRISING FLUORIDED SUPPORT AND PROCESSES FOR USE THEREOF

PRIORITY CLAIM

This application is a National Phase Application of International Application Serial No. PCT/US2016/021751, filed Mar. 10, 2016, that claims the benefit of U.S. Provisional Application Ser. No. 62/149,814, filed Apr. 20, 2015, and European Application No. 15173732.7, filed Jun. 25, 2015, the disclosures of both are fully incorporated herein by reference in their entireties.

FIELD OF THE INVENTION

This invention relates to novel catalyst compositions comprising a monocyclopentadienyl transition metal compound, a fluorided support, and an optional activator and uses thereof.

BACKGROUND OF THE INVENTION

Olefin polymerization catalysts are of great use in industry. Hence, there is interest in finding new catalyst systems that increase the commercial usefulness of the catalyst and allow the production of polymers having improved properties. Catalysts for olefin polymerization are often based on cyclopentadienyl transition metal compounds as catalyst precursors, which are activated either with an alumoxane or with an activator containing a non-coordinating anion.

A typical metallocene catalyst system includes a metallocene catalyst, a support, and an activator. Supported catalyst systems are used in many polymerization processes, often in slurry or gas phase polymerization processes. For example, U.S. Pat. Nos. 6,846,770 and 6,664,348 disclose catalyst compositions containing at least one metallocene, and least one activator and a support that has been fluorided using a fluoride containing compound. See also, WO 05/075525; US 2002/007023; WO 2003/025027; US 2005/0288461; and US 2014/0031504.

Metallocenes are often combined with other catalysts, or even other metallocenes, to attempt to modify polymer properties. See, for example, U.S. Pat. No. 8,088,867. Likewise, U.S. Pat. No. 5,516,848 discloses the use of two different cyclopentadienyl based transition metal compounds activated with alumoxane or non-coordinating anions. In particular, the examples disclose, among other things, catalyst compounds in combination, such as Me$_2$Si(Me$_4$C$_5$)(N-c-C$_{12}$H$_{23}$)TiCl$_2$ and rac-Me$_2$Si(H$_4$Ind)ZrCl$_2$, or Me$_2$Si(Me$_4$C$_5$)(N-c-C$_{12}$H$_{23}$)TiCl$_2$ and Me$_2$Si(Ind$_2$)HfMe$_2$, (Ind=indenyl) activated with activators such as methylalumoxane or N,N-dimethyl anilinium tetrakis(pentafluorphenyl)borate to produce polypropylenes having bimodal molecular weight distributions (Mw/Mn), varying amounts of isotacticity (from 12 to 52 weight % isotactic PP in the product in Ex 2, 3 and 4), and having weight average molecular weights over 100,000, and some even as high as 1,200,000 for use as thermoplastics. See also, U.S. Pat. Nos. 4,701,432; 5,077,255; 7,141,632; 6,207,606; 8,598,061; Hong et al. in *Immobilized Me$_2$Si(C$_5$Me$_4$)(N-t-Bu)TiCl$_2$/ (nBuCp)$_2$ZrCl$_2$ Hybrid Metallocene Catalyst System for the Production of Poly(ethylene-co-hexene) with Psuedo-bimodal Molecular Weight and Inverse Comonomer Distribution*, (Polymer Engineering and Science—2007, DOI 10.1002/pen, pages 131-139, published online in Wiley InterScience (www.interscience.wiley.com) 2007 Society of Plastics Engineers); US 2012/0130032; U.S. Pat. Nos. 7,192,902; 8,110,518; 7,355,058; 5,382,630; 5,382,631; 8,575,284, 6,069,213; Kim, J. D. et al., J. Polym. Sci. Part A: Polym Chem., 38, 1427 (2000); Iedema, P. D. et al., Ind. Eng. Chem. Res., 43, 36 (2004); U.S. Pat. Nos. 6,656,866; 8,815,357; US 2004/259722; US 2014/0031504; U.S. Pat. Nos. 5,135,526; 7,385,015; WO 2007/080365; WO 2012/006272; WO 2014/0242314; WO 00/12565; WO 02/060957; WO 2004/046214; WO 2009/146167; and EP 2 374 822 A.

There is still a need in the art for new and improved catalyst systems for the polymerization of olefins, in order to achieve increased activity or specific polymer properties, such as high melting point, high molecular weights, to increase conversion or comonomer incorporation, or to alter comonomer distribution without deteriorating the resulting polymer's properties.

SUMMARY OF THE INVENTION

This invention relates to a catalyst system comprising fluorided silica, alkylalumoxane activator, and a bridged monocyclopentadienyl group 4 transition metal compound, where the fluorided support has not been calcined at a temperature of 400° C. or more.

This invention also relates to a process to produce ethylene polymer comprising: i) contacting, in the gas phase or slurry phase, ethylene and C$_3$ to C$_{20}$ comonomer with a catalyst system comprising a fluorided support, an alkyl alumoxane activator, and a bridged monocyclopentadienyl group 4 transition metal compound, where the fluorided support has not been calcined at a temperature of 400° C. or more, and ii) obtaining a polymer comprising at least 50 mol % ethylene.

This invention also relates to a catalyst system comprising a fluorided support, an alkylalumoxane activator, and one metallocene catalyst compound, where the metallocene is represented by the formula:

wherein each Cp is, independently, a cyclopentadienyl group (such as cyclopentadiene, indene, or fluorene) which may be substituted or unsubstituted, M is a group 4 transition metal, for example, titanium, zirconium, hafnium, G is a heteroatom containing group bonded to M and, optionally, T and represented by the formula JR*$_z$ where J is N, P, O or S, and R* is C$_1$-C$_{20}$ hydrocarbyl group z is 1 or 2, T is a bridging group, and y is 0 or 1, X is a leaving group (such as a halide, a hydride, an alkyl group, an alkenyl group or an alkylaryl group), and m=1, n=1, 2 or 3, q=1, 2 or 3, and the sum of m+n+q is equal to the oxidation state of the transition metal; wherein preferably, m=1, n=1, and y=1.

BRIEF DESCRIPTION OF THE DRAWINGS

FIG. 5 is a TREF of LLDPE produced with supported catalyst C in Example 2.

DETAILED DESCRIPTION OF THE INVENTION

Figure 1:
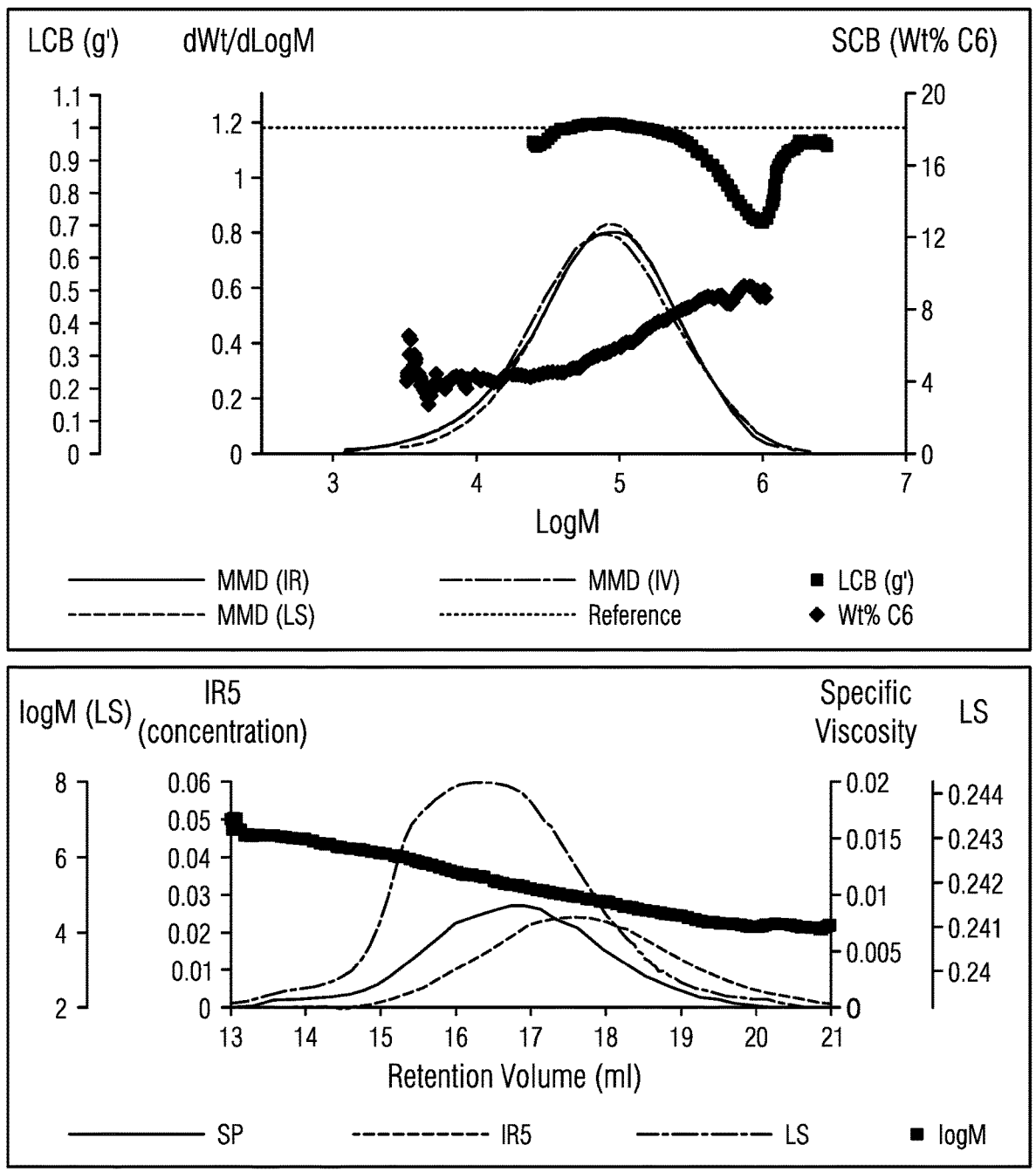
FIG. 1 is a GPC of LLDPE produced with supported Catalyst A Example 2.
Figure 2:
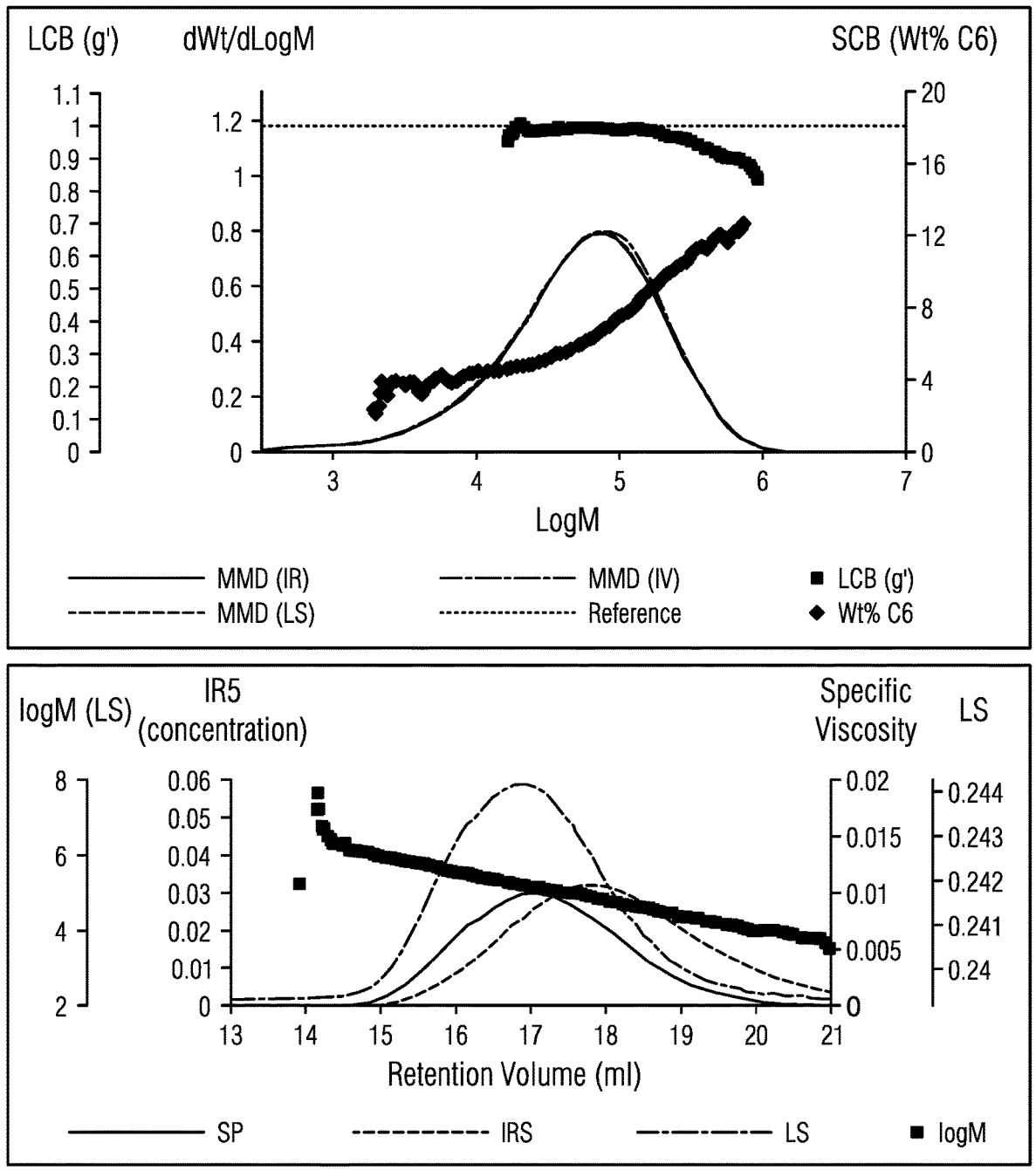
FIG. 2 is a GPC of LLDPE produced with supported catalyst B in Example 2.

For the purposes of this invention and the claims thereto, the new numbering scheme for the Periodic Table Groups is used as described in CHEMICAL AND ENGINEERING NEWS, 63(5), pg. 27, (1985), e.g., a "Group 4 metal" is an element from Group 4 of the Periodic Table, e.g., Hf, Ti, or Zr.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at 50 mol % propylene derived units, and so on.

For the purposes of this invention, ethylene shall be considered an α-olefin.

For purposes of this invention and claims thereto, the term "substituted" means that a hydrogen group has been replaced with a heteroatom, or a heteroatom containing group. For example, a "substituted hydrocarbyl" is a radical made of carbon and hydrogen where at least one carbon is replaced by a heteroatom or at least one hydrogen is replaced by a heteroatom containing group wherein each heteroatom is independently selected from groups 13-16 excluding carbon, and are preferably, selected from B, Al, Si, Ge, N, P, O, S, and Se.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, Cp is cyclopentadienyl, Cp* is pentamethyl cyclopentadienyl, Ind is indenyl, Flu is fluorenyl, and MAO is methylalumoxane.

For purposes of this invention and the claims thereto, a "catalyst system" is the combination of at least one catalyst compound, at least one activator, an optional co-activator, and fluorided support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, metallocene catalyst compound or a transition metal compound, and these terms are used interchangeably.

A metallocene catalyst is defined as an organometallic transition metal compound with at least one π-bound cyclopentadienyl moiety (or substituted cyclopentadienyl moiety) bound to a transition metal.

For purposes of this invention and claims thereto in relation to metallocene catalyst compounds, the term "substituted" means that a hydrogen group has been replaced with a hydrocarbyl group, a halocarbyl group, a halogen, or a heteroatom containing group. For example, methyl cyclopentadiene (Cp) is a Cp group substituted with a methyl group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

This invention relates to a catalyst system comprising a fluorided support, an alkylalumoxane activator, and at least one metallocene catalyst compound, where the metallocene is a bridged monocyclopentadienyl group 4 transition metal compound, preferably, the metallocenes are represented by the formula: $T_yCp_mMG_nX_q$ wherein Cp is a cyclopentadienyl group (such as cyclopentadiene, indene or fluorene) which may be substituted or unsubstituted, M is a group 4 transition metal, for example titanium, zirconium, hafnium, G is a heteroatom group represented by the formula $JR^*_z$ where J is N, P, O or S, and R* is a $C_1$-$C_{20}$ hydrocarbyl group, and z is 1 or 2, T is a bridging group, and y is 0 or 1, X is a leaving group (such as a halide, a hydride, an alkyl group, an alkenyl group or an alkylaryl group), and m=1, n=1, 2, or 3, q=1, 2, or 3, and the sum of m+n+q is equal to the oxidation state of the transition metal (such as 2, 3, 4, preferably, 4); wherein preferably, m=1, n=1 and y=1.

The catalyst compound is present on the support at 1 to 100 µmol/g supported catalyst, preferably, 20-60 µmol/g supported catalyst.

This invention also relates to metallocene catalyst compositions comprising the reaction product of at least three components: (1) one or more bridged metallocenes having one cyclopentadienyl group; (2) one or more alkylalumoxane activators; and (3) one or more fluorided support compositions, where the fluorided support composition has not been calcined at 400° C. or more, preferably, the fluorided support composition has been calcined at a temperature of 100° C. to 395° C., alternately 125° C. to 350° C., alternately 150° C. to 300° C.

Typically, the fluorided supports described herein are prepared by combining a solution of polar solvent (such as water) and fluorinating agent (such as $SiF_4$ or $(NH_4)_2SiF_6$) with a slurry of support (such as a toluene slurry of silica), then drying until it is free flowing, and, optionally, calcining (typically at temperatures over 100° C. for at least 1 hour). The supports are then combined with activator(s) and catalyst compound (separately or together).

Fluorided Supports

As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Likewise, the term "support composition" means a support, desirably particulate and porous, which has been treated with at least one fluorine containing compound. Suitable fluorine containing compounds include, but are not limited to, inorganic fluorine containing compounds and/or organic fluorine containing compounds.

Supports suitable for use in this invention are generally porous materials and can include organic materials, inorganic materials and inorganic oxides. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride and substituted polystyrene and mixtures thereof. Other useful support materials include zeolites, clays, organoclays, or any other organic or inorganic support material and the like, or mixtures thereof.

Preferably, the support material is an inorganic oxide in a finely divided form. Suitable inorganic oxide materials for use in the catalyst systems described herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably, $SiO_2$, $Al_2O_3$, or $SiO_2/Al_2O_3$. In a preferred embodiment, of the invention the support is silica.

It is preferred that the support material, preferably, an inorganic oxide, preferably, silica, has a surface area in the range of from about 10 to about 800 $m^2/g$ (alternately, about 10 to about 700 $m^2/g$), pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably, the surface area of the support material is in the range of from about 100 to about 400 $m^2/g$, pore volume from about 0.8 to about 3.0 cc/g and average particle size is from about 5 to about 100 μm. The average pore size of the support material useful in the invention is in the range of from 10 to 1000 Å, preferably, 50 to about 500 Å, and most preferably, 75 to about 350 Å. In some embodiments, the support material is a high surface area, amorphous silica (surface area=300 $m^2/gm$; pore volume of 1.65 $cm^3/gm$). Useful silicas are marketed under the tradenames of DAVISON™ 952, DAVISON™ 948 or DAVISON™ 955 by the Davison Chemical Division of W.R. Grace and Company. Total surface area, also referred to as "surface area" and total pore volume, also referred to as "pore volume", and average pore diameter are measured by the Brunauer-Emmett-Teller (BET) method using adsorption-desorption of nitrogen (temperature of liquid nitrogen, 77 K) with a Micromeritics Tristar II 3020 instrument after degassing of the powders for 4 hrs. at 350° C. More information regarding the method can be found, for example, in "*Characterization of Porous Solids and Powders: Surface Area, Pore Size and Density*", S. Lowell et al., Springer, 2004. Average particle size, also referred to as "particle size," or "particle diameter" is determined using a Mastersizer™ 3000 (range of 1 to 3500 μm) available from Malvern Instruments, Ltd. Worcestershire, England.

In a particularly useful embodiment, the support is silica, is desirably porous and has a surface area in the range of from about 10 to about 800 $m^2/g$, a total pore volume in the range of from about 0.1 to about 4.0 cc/g and an average particle diameter in the range of from about 10 to about 500 μm. More desirably, the surface area is in the range of from about 50 to about 500 $m^2/g$, the pore volume is in the range of from about 0.5 to about 3.5 cc/g and the average particle diameter is in the range of from about 15 to about 150 μm. Most desirably the surface area is in the range of from about 100 to about 400 $m^2/g$, the pore volume is in the range of from about 0.8 to about 3.0 cc/g and the average particle diameter is in the range of from about 20 to about 100 μm. The average pore diameter of typical porous silicon dioxide support materials is in the range of from about 10 to about 1,000 Å. Desirably, the support material has an average pore diameter of from about 50 to about 500 Å, and most desirably from about 75 to about 350 Å.

The fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate, $SiF_4$, and ammonium tetrafluoroborate are particularly useful. Combinations of two or more inorganic fluorine containing compounds may also be used.

Ammonium hexafluorosilicate and ammonium tetrafluoroborate fluorine compounds are typically solid particulates as are the silicon dioxide supports. A useful method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is preferably, in the range of from 0.1 to 25 wt %, alternately 0.19 to 19 wt %, alternately from 0.6 to 3.5 wt %, based upon the weight of the support.

Another method of treating the support with the fluorine compound is to dissolve the fluorine compound in a solvent, such as water, and then contact the support (dry or combined with water or hydrocarbon solvent) with the fluorine compound containing solution. When water is used and silica is the support, it is desirable to use a quantity of water which is less than the total pore volume of the support.

A disadvantage of typical dry mix methods is that the density difference between fluorinating agent (such as ammonium hexafluorosilicate—density about 2.1 $g/cm^3$) and silica (e.g., such as Davison™ 948—density about 0.7 $g/cm^3$) makes it difficult to evenly/homogeneously distribute the fluorinating agent in the silica support. The density difference has also led to settling of ammonium hexafluorosilicate in fluorided silica derived from dry mix method. Over a period of two weeks, a vertical gradient of ammonium hexafluorosilicate concentrations in fluorided silica (made via dry mix method) stored in a bottle was observed. Such settling can lead to operational problems on a commercial scale.

To overcome these problems, an alternative method (wet-mixing) has been developed. The wet-mixing method employs a minimal amount of a polar solvent (e.g., water, or methanol, ethanol, isopropanol, any solvent capable of dissolving the fluoride compound (such as ammonium hexafluorosilicate) to dissolve the fluorinating agent (e.g., ammonium hexafluorosilicate). The fluoride compound solution (such as an ammonium hexafluorosilicate solution) is then added to a slurry of silica in a non-polar solvent (e.g., toluene, or benzene, chloroform, etc.), followed by vigorous stirring of the resulting mixture. The polar/hydrophilic nature of the fluoride compound (such as ammonium hexafluorosilicate) leads to its absorption onto the hydrophilic silica surface. When the non-polar solvent is removed (by filtration), silica with an even distribution of fluorinating agent (such as ammonium hexafluorosilicate) is obtained, and ready for subsequent drying and calcination steps. The wet-mixing method (especially the aqueous version of the wet method) also provides for simplified work-up and fast drying. Calcination can be done for shorter time periods based on the low volume of water or other polar solvent used.

This method reduces or eliminates non-homogeneous distribution of fluorinating agent in silica associated with other methods. In addition, fluorided silica prepared via wet-mixing method gave excellent operability, whereas fluorided silica prepared via dry-mixing method often gave poor operability due to frequent plugging of catalyst feed line.

Dehydration or calcining of the silica is not necessary prior to reaction with the fluorine compound, but can be done if desired. Desirably the reaction between the silica and fluorine compound is carried out at a temperature of from about 100° C. to about 400° C., and more desirably from about 150° C. to about 350° C. for about two to eight hrs.

In one embodiment, the fluorided support composition may be generically represented by the formula: Sup-F, where "Sup" is a support, "F" is a fluorine atom bound to the support. The fluorine atom may be bound, directly or indirectly, chemically or physically to the support. An example of chemical or physical bonding would be covalent and ionic bonding, respectively.

In another embodiment, the fluorided support composition is represented by the formula: Sup-LF$_n$, where "Sup" is a support, preferably, selected from the group consisting of talc, clay, silica, alumina, magnesia, zirconia, iron oxides, boric, calcium oxide, zinc oxide, barium oxide, thoria, aluminum phosphate gel, polyvinylchloride and substituted polystyrene; "L" is a first member selected from the group consisting of (i) bonding, sufficient to bound the F to the Sup; (ii) B, Ta, Nb, Ge, Ga, Sn, Si, P, Ti, Mo, Re, Al, or Zr bound to the Sup and to the F; and (iii) O bound to the Sup and bound to a second member selected from the group consisting of B, Ta, Nb, Ge, Ga, Sn, Si, P, Ti, Mo, Re, Al, or Zr, which is bound to the F; "F" is a fluorine atone; and "n" is a number from 1-7.

An example of such bonding sufficient to bound the F to the Sup would be chemical or physical bonding, such as, for example, covalent and ionic bonding.

The fluorided support material is then typically slurried in a non-polar solvent and the resulting slurry is contacted with a solution of a metallocene compound and activator. In some embodiments, the slurry of the fluorided support material is first contacted with the activator for a period of time in the range of from about 0.5 hrs. to about 24 hrs., from about 1 hour to about 16 hrs., or from about 2 hrs. to about 8 hrs. The solution of the metallocene compound is then contacted with the isolated fluorided support/activator. In some embodiments, the supported catalyst system is generated in situ. In alternate embodiment, the slurry of the fluorided support material is first contacted with the catalyst compound for a period of time in the range of from about 0.5 hrs. to about 24 hrs., from about 1 hour (or 2 hrs.) to about 16 hrs., or from about 2 hrs. (or 4 hrs.) to about 8 hrs. The slurry of the supported metallocene compound is then contacted with the activator solution.

The mixture of the metallocene, activator and fluorided support may be heated to about 0° C. to about 70° C., preferably, to about 23° C. to about 60° C., preferably, at room temperature. Contact times typically range from about 0.5 hrs. to about 24 hrs., from about 2 hrs. to about 16 hrs., or from about 4 hrs. to about 8 hrs.

In a preferred embodiment of the invention, the fluorided support material is slurried in a non-polar solvent and the resulting slurry is contacted with a solution of methylalumoxane (typically 30 wt % MAO in toluene). The fluorided support/MAO mixture is then heated to an elevated temperature (30° C. to 120° C., preferably, 80 to 100° C.) with vigorous stirring for a period of time (0.1 to 24 hrs., preferably, 1 to 3 hrs.). The support/activator is isolated by filtration, rinsed with non-polar solvent (e.g., toluene, pentane, hexane, etc.), and dried. The isolated support/activator is then slurried in a non-polar solvent (e.g., toluene), and a solution of metallocene compound/compounds is then contacted with the support/activator slurry. Vigorous stirring may then be applied.

In a preferred embodiment of the invention, the fluorided support material is slowly added in solid form to a solution of MAO in a non-polar solvent (e.g., toluene) (typically at room temperature) with vigorous stirring. This addition sequence, namely slow and portion-wise addition of fluorided silica to MAO solution, is referred to as "reversed addition". After the addition of fluorided silica is completed, the fluorided support/MAO mixture is then heated to elevated temperature (30° C. to 120° C., preferably, 80 to 100° C.) with vigorous stirring for a period of time (0.1 to 24 hrs., preferably, 1 to 3 hrs.). The support/activator is isolated by filtration, rinsed with non-polar solvent (e.g., toluene, pentane, hexane, etc.), and dried. The isolated support/activator is then slurried in a non-polar solvent (e.g., toluene), and a solution of metallocene compound/compounds is then contacted with the support/activator slurry. Vigorous stirring may be applied.

Under otherwise identical conditions, the "reversed addition" method for immobilizing MAO on fluorided silica surface offers higher polymerization activity for a wide variety of catalysts, compared to the "traditional addition" method where MAO solution is added to a slurry of fluorided silica in non-polar solvent.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In a preferred embodiment of the invention, the fluorided supports described herein are prepared by combining a solution of polar solvent and fluorinating agent (such as ($NH_4$)$_2$$SiF_6$) with a slurry of support (such as a toluene slurry of silica), drying until free flowing, optionally, calcining (typically at temperatures from 100° C. to 400° C. for at least 1 hour), then combining with activators and catalyst compounds (the activators and catalyst compounds may be added to the support separately or together).

In another embodiment of the invention, the water to solvent ratio (by weight) is between 1:10 to 1:1000, preferably, between 1:20 to 1:50.

In another embodiment of the invention, the fluorided silica support can immobilize greater than 5.0 mmol "Al" per gram silica, and preferably, greater than 6.0 mmol "Al"/gram silica. The amount of "Al" (from alkylalumoxane, such as MAO) that can be immobilized on 1 gram of fluorided silica is determined by an aluminum titration experiment. The titration is done at 100° C. at ambient pressure allowing the alumoxane (15 mmol Al) and the 1 gram of fluorided silica to react for 3 hrs. Thereafter, the silica is washed with toluene (10 ml, 3 times) and then washed with pentane (10 ml, 3 times). The solid is then collected and dried in vacuo for 8 hrs. until solvent is removed. Then the sample is weighed and the difference in weight is divided by the Mw of the aluminum compound (Mw as reported in the CHEMICAL AND ENGINEERING NEWS, 63(5), pg. 27, (1985)). Methyl alumoxane is defined to be Me—Al—O. The "Al" uptake for silica-1 in the examples below was about 5.5 mmol Al/gram, whereas the "Al" uptake for silica-2 was about 6.8 mmol/gram. Higher Al uptake (or loading) is often desirable as it is thought to offer higher polymerization activity, provided the silica and the catalyst precursor stay unchanged. In a useful embodiment of the invention, the catalyst system comprising the fluorided silica support immobilizes greater than 5.0 mmol "Al" per gram of silica, and preferably, greater than 6.0 mmol "Al" per gram of silica.

Alternately, the fluorided silica support preferably, contain less than 0.05 mmol/gram fluorinating agent (such as ($NH_4$)$_2$$SiF_6$), preferably, less than 0.02 mmol/gram fluorinating agent, as measured by $^1$H NMR.

Alternately, the surface area of the fluorided silica support is greater than 200 m$^2$/g, preferably, greater than 250 m$^2$/g, as determined by BET. Alternatively, the surface area of combined fluorided silica support and activator (such as MAO) is greater than 250 m$^2$/g, preferably, greater than 350 m$^2$/g, as determined by BET.

In embodiments where $SiF_4$ and/or ($NH_4$)$_2$$SiF_6$ is/are the fluoriding agent, immediately after combination of the alkylalumoxane with the fluorided support the combination preferably, contains less than 0.04 mmoles pre gram of silica (preferably, less than 0.02 mmoles, preferably, less than 0.01 mmoles) of tetraalkylsilane per gram of support as determined by $^1$H NMR (where the alkyl is derived from the alkylalumoxane).

In useful embodiments, the ratio of mmol of fluorine per gram of silica in the fluorided support is between 0.1 and 1.5, preferably, between 0.2 and 1.2, preferably, between 0.4 and 1.0.

For fluorided silica prepared using ($NH_4$)$_2$$SiF_6$, the amount of residual ($NH_4$)$_2$$SiF_6$ in the silica should be equal or less than 0.04 mmol ($NH_4$)$_2$$SiF_6$/g silica, preferably, equal or less than 0.02 mmol ($NH_4$)$_2$$SiF_6$/g silica, more preferably, equal or less than 0.01 mmol ($NH_4$)$_2$$SiF_6$/g silica.

Catalyst Compounds

Useful catalysts include compounds represented by the formula:

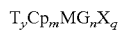

$$T_y Cp_m MG_n X_q$$

wherein Cp is a cyclopentadienyl group (such as cyclopentadiene, indene or fluorene) which may be substituted or unsubstituted, M is a Group 4 transition metal, for example titanium, zirconium, hafnium, G is a heteroatom group represented by the formula $JR^*_z$ where J is a group 15 or 16 element, preferably, N, P, O or S, and R* is a linear, branched or cyclic hydrocarbyl group having from one to twenty carbon atoms and z is 1 or 2, T is a bridging group, and y is 0 or 1, each X is, independently, a leaving group, or two X are joined and bound to the metal atom to form a metallocycle ring, or two X are joined to form a chelating ligand, a diene ligand, or an alkylidene ligand; and m=1, n=1, 2 or 3, q=1, 2, or 3, and the sum of m+n+q is equal to the oxidation state of the transition metal (preferably, 2, 3, or 4, preferably, 4).

In a preferred embodiment of the invention, M is a Group 4 transition metal (preferably, Hf, Ti, and/or Zr, preferably, Ti).

In a preferred embodiment, m is one, n is one, y is one, each X is independently a univalent anionic ligand, q is two and the transition metal is in the plus four oxidation state.

Typically, each G is, independently, a heteroatom group represented by the formula $JR^*_z$ where J is a group 15 or 16 element, preferably, N, P, O or S (preferably, N or O, preferably, N), and R* is a $C_1$-$C_{20}$ hydrocarbyl group and z is 1 or 2.

In an embodiment of the invention R* is a $C_1$-$C_{20}$ alkyl group (such as methyl, ethyl, propyl, butyl, pentyl, hexyl, heptyl, octyl, nonyl, decyl, undecyl, dodecyl or an isomer thereof, including linear, branched, or $C_3$-$C_{20}$ cyclic isomers and combinations thereof such as t-butyl, neopentyl, cyclododecyl, cyclodecyl, cyclooctyl, cyclohexyl, cyclohexylmethyl, and the like).

In an embodiment of the invention R* is a $C_1$-$C_{20}$ hydrocarbyl group comprising a polycyclic ring structure (such as bicyclo[2.2.1]heptyl (norbornyl), bicyclo[2.2.2]octyl, spiro[4.5]decyl, octahydropentalenyl, adamantyl, and the like).

In an embodiment, when m is one, n is preferably, 1 and G is a heteroatom group represented by the formula $JR^*_z$ where J is a group 15 or 16 element, preferably, N, P, O, or S (preferably, N or O, preferably, N), and R* is a $C_1$-$C_{20}$ hydrocarbyl group and z is 1 or 2, preferably, $JR^*z$ is cyclododecyl amido, t-butyl amido, and or adamant-1-yl amido.

In an embodiment each X may be, independently, a halide, a hydride, an alkyl group, an alkenyl group or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably, each X is independently selected from halides, aryls, alkylaryls (such as benzyl) and $C_1$ to $C_5$ alkyl groups, preferably, each X is a benzyl, methyl, ethyl, propyl, butyl, pentyl, or chloro group.

Typically, each Cp group is, independently, a substituted or unsubstituted cyclopentadiene, a substituted or unsubstituted indene, or a substituted or unsubstituted fluorene.

Independently, each Cp group may be substituted with a combination of substituent groups R, where each R is independently, R group as hydrogen or a hydrocarbyl or a substituted hydrocarbyl. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably, from 1 to 30 carbon atoms, that can also be substituted with halogens or heteroatoms or the like. Non-limiting examples of substituents R include methyl, ethyl, propyl, butyl, pentyl, hexyl, cyclopentyl, cyclohexyl, benzyl or phenyl groups and the like, including all their isomers, for example, tertiary butyl, isopropyl, and the like. Other radicals useful as R include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; Further radicals useful as R include: 1) halocarbyl-substituted organometalloid radicals including tris(trifluoromethyl)-silyl, methylbis(difluoromethyl)silyl, bromomethyldimethylgermyl and the like; 2) disubstituted boron radicals including dimethylboron for example; 3) disubstituted pnictogen radicals including dimethylamine, dimethylphosphine, diphenylamine, methylphenylphosphine, 4) chalcogen radicals including methoxy, ethoxy, propoxy, phenoxy, methylsulfide and ethylsulfide. Also, at least two R groups, preferably, two adjacent R groups, may be joined to form a ring structure having from 3 to 20 non-hydrogen atoms selected from carbon, nitrogen, oxygen, phosphorus, silicon, germanium, aluminum, boron, or a combination thereof.

In an embodiment of the Cp group, the substituent(s) R are, independently, hydrocarbyl groups, halocarbyl groups, halogen, or heteroatom containing groups, such as methyl, ethyl, propyl, butyl, pentyl, hexyl, heptyl, octyl, nonyl, decyl, undecyl, dodecyl or an isomer thereof, N, O, S, P, or a $C_1$ to $C_{20}$ hydrocarbyl substituted with an N, O, S, and or P heteroatom or heteroatom containing group (typically having up to 12 atoms, including the N, O, S, and P heteroatoms).

Non-limiting examples of Cp groups include cyclopentadienyl ligands, cyclopentaphenanthreneyl ligands, indenyl ligands, indacenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine ligands (WO 99/40125), pyrrolyl ligands, pyrazolyl ligands, carbazolyl ligands, borabenzene ligands and the like, including hydrogenated versions thereof, for example, tetrahydroindenyl ligands. In another embodiment, each Cp may, independently comprise one or more heteroatoms, for example, nitrogen, silicon, boron, germanium, sulfur and phosphorus, in combination with carbon atoms to form an open, acyclic, or preferably, a fused, ring or ring system, for example, a heterocyclopentadienyl ancillary ligand. Other Cp ligands include, but are not limited to, porphyrins, phthalocyanines, corrins and other polyazamacrocycles. Particularly useful Cp groups include, cyclopentadiene, indene, fluorene, and substituted versions thereof.

Preferably, T is present and is a bridging group containing at least one Group 13, 14, 15, or 16 element, in particular boron or a Group 14, 15, or 16 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a $C_1$-$C_{20}$ containing hydrocarbyl, substituted hydrocarbyl, halocarbyl, substituted halocarbyl, silylcarbyl or germylcarbyl substituent and optionally, two or more adjacent R' may join to form a substituted or unsubstituted, saturated, partially unsaturated or aromatic, cyclic or polycyclic substituent. Preferred examples for the bridging group T include $CH_2$, $CH_2CH_2$, $SiMe_2$, $SiPh_2$, SiMePh, Si($CH_2$)$_3$, Si($CH_2$)$_4$, O, S, NPh, PPh, NMe, PMe, NEt, NPr, NBu, PEt, PPr, and PBu.

In a preferred embodiment of the invention in any embodiment of any formula described herein, T is represented by the formula $R^a_2J$ or $(R^a_2J)_2$ where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$-$C_{20}$ substituted hydrocarbyl, and two $R^a$ can form a cyclic structure including aromatic, partially saturated, or saturated cyclic or fused ring system.

Preferably, T is a bridging group comprising carbon or silica, such as dialkylsilyl, preferably, T is selected from $CH_2$, $CH_2CH_2$, $C(CH_3)_2$, $SiMe_2$, $SiPh_2$, SiMePh, silylcyclobutyl (Si($CH_2$)$_3$), (Ph)$_2$C, (p-(Et)$_3$SiPh)$_2$C, and cyclopentasilylene (Si($CH_2$)$_4$).

Useful bridged metallocene compounds having one cyclopentadienyl ring include those represented by the formula:

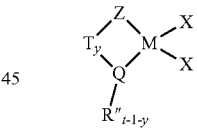

wherein
M is titanium, zirconium or hafnium, preferably, titanium;
Z is a substituted or unsubstituted Cp group (useful Z groups are represented by the formula: ($C_5H_{4-d}S^*_d$), where d is 1, 2, 3, or 4, S* is hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a $C_1$-$C_{20}$ hydrocarbyl substituted with an N, O, S, and or P heteroatom or heteroatom containing group (typically having up to 12 atoms, including the N, O, S, and P heteroatoms) and two S* may form a cyclic or multicyclic group, preferably, Z is tetramethylcyclopentadienyl;
T is a bridging group as described above that is bonded to Z and Q, y is one;
Q is a heteroatom with a coordination number of three from Group 15 or with a coordination number of two from Group 16 of the Periodic Table of Elements, such as N, O, S, or P and preferably, Q is nitrogen;

R" is selected from a $C_3$-$C_{100}$ substituted or unsubstituted monocyclic or polycyclic ring structure substituent that is partially unsaturated, unsaturated or aromatic; or a $C_2$-$C_{100}$ substituted or unsubstituted, unsaturated or partially unsaturated, linear or branched alicyclic hydrocarbyl substituent; or a $C_1$-$C_{100}$ substituted or unsubstituted saturated hydrocarbyl radical (preferably, R" is selected from methyl, ethyl, all propyl isomers, all butyl isomers, phenyl, benzyl, phenethyl, 1-adamantyl, cyclododecyl, cyclohexyl and norbornyl);

t is the coordination number of the heteroatom Q where "t−1−y" indicates the number of R" substituents bonded to Q; and each X is, independently, a leaving group (such as a univalent anionic ligand), or two X are joined and bound to the metal atom to form a metallocycle ring, or two X are joined to form a chelating ligand, a diene ligand, or an alkylidene ligand.

Illustrative, but not limiting, examples of preferred monocyclopentadienyl metallocenes for use in this invention's mixed catalyst composition include:

dimethylsilylene (tetramethylcyclopentadienyl)(cyclododecylamido)titanium dimethyl,
dimethylsilylene (tetramethylcyclopentadienyl)(cyclododecylamido)titanium dichloride,
dimethylsilylene (tetramethylcyclopentadienyl)(t-butylamido)titanium dimethyl,
dimethylsilylene (tetramethylcyclopentadienyl)(t-butylamido)titanium dichloride,
μ-$(CH_3)_2$Si(cyclopentadienyl)(adamant-1-ylamido)M$(R)_2$;
μ-$(CH_3)_2$Si(3-tertbutylcyclopentadienyl)(adamant-1-ylamido)M$(R)_2$;
μ-$(CH_3)_2$(tetramethylcyclopentadienyl)(adamant-1-ylamido)M$(R)_2$;
μ-$(CH_3)_2$Si(tetramethylcyclopentadienyl)(adamant-1-ylamido)M$(R)_2$;
μ-$(CH_3)_2$C(tetramethylcyclopentadienyl)(adamant-1-ylamido)M$(R)_2$;
μ-$(CH_3)_2$Si(tetramethylcyclopentadienyl)(tertbutylamido)M$(R)_2$;
μ-$(CH_3)_2$Si(fluorenyl)(1-tertbutylamido)M$(R)_2$;
μ-$(CH_3)_2$Si(tetramethylcyclopentadienyl)(1-cyclododecylamido)M$(R)_2$;
μ-$(C_6H_5)_2$C(tetramethylcyclopentadienyl)(1-cyclododecylamido)M$(R)_2$;
μ-$(CH_3)_2$Si($\eta^5$-2,6,6-trimethyl-1,5,6,7-tetrahydro-s-indacen-1-yl)(tertbutylamido)M$(R)_2$;

where M is selected from a group consisting of Ti, Zr, and Hf and R is selected from halogen or $C_1$ to $C_5$ alkyl, preferably, R is a methyl group. In a preferred embodiment, M is Ti and R is Cl, Br or Me.

In alternate embodiments, two or more different monocyclopentadienyl compounds may be used herein. For purposes of this invention, one metallocene catalyst compound is considered different from another if they differ by at least one atom. For example, "bisindenyl zirconium dichloride" is different from (indenyl)(2-methylindenyl) zirconium dichloride," which is different from "(indenyl)(2-methylindenyl) hafnium dichloride." Catalyst compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl.

In a preferred embodiment one monocyclopentadienyl compound is used in the catalyst system.

Synthesis of monocyclopentadienyl complexes is known in the art, and, for example, has been disclosed in WO 93/19103, U.S. Pat. Nos. 5,096,867 and 5,264,405.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, used alone or in combination with ionizing anion precursor compounds that abstract a reactive, σ-bound, metal ligand making the metal complex cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Non Coordinating Anion Activators

In alternate embodiments, the alkylalumoxanes can be used in combination with non-coordinating anion activators. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), in combination with the alumoxane or modified alumoxane activators. It is also within the scope of this invention to use neutral or ionic activators in combination with the alumoxane or modified alumoxane activators.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)-phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)-phenyl)borate, triphenylcarbenium tetrakis(perfluorophenyl)borate, [Ph$_3$C$^+$][B(C$_6$F$_5$)$_4$$^-$], [Me$_3$NH$^+$][B(C$_6$F$_5$)$_4$$^-$]; 1-(4-(tris(pentafluorophenyl)borate)-2,3,5,6-tetrafluorophenyl)-pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkyl-ammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluoro-biphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

Optional Scavengers or Co-Activators

In addition to the activator compounds, scavengers, chain transfer agents or co-activators may be used. Aluminum alkyl or organoaluminum compounds, which may be utilized as scavengers or co-activators include, for example, trimethylaluminum, triethylaluminum, triisobutylaluminum, tri-n-hexylaluminum, tri-n-octylaluminum, and diethyl zinc.

Useful chain transfer agents that may also be used herein are typically a compound represented by the formula AlR$_3$, ZnR$_2$ (where each R is, independently, a C$_1$-C$_8$ aliphatic radical, preferably, methyl, ethyl, propyl, butyl, penyl, hexyl octyl or an isomer thereof) or a combination thereof, such as diethyl zinc, trimethylaluminum, triisobutylaluminum, trioctylaluminum, or a combination thereof.

Preparation of the Supported Catalyst

In an embodiment, this invention describes the preparation of fluorided supports (such as silica) through the addition of a solution of polar solvent (such as water) and fluorine compound (such as (NH$_4$)$_2$SiF$_6$) to a slurry of support (such as a toluene slurry of silica). This preparation method contributes to an even distribution of the fluoride compound (such as (NH$_4$)$_2$SiF$_6$) onto the support surface (such as the silica surface), in contrast to a less homogeneous distribution observed when the solid salt is combined with the solid silica as described in US 2002/0123582 A1. Metallocenes supported on the fluorided support from this preparation exhibit comparable or higher activity compared to supported metallocenes on fluorided supports made through solid/solid mixing.

In an embodiment, an aqueous solution of fluorinating agent (such as (NH$_4$)$_2$SiF$_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over 100° C. for at least 1 hour).

In an embodiment, a solution of polar solvent and fluorinating agent (such as (NH$_4$)$_2$SiF$_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over 100° C. for at least 1 hr.).

Polymerization Processes

In embodiments herein, the invention relates to polymerization processes where monomer (such as ethylene), and, optionally, comonomer (such as hexene), are contacted with a catalyst system comprising the result of the combination of an activator, a fluorided support, and a metallocene compound, as described above. The catalyst compound, support and activator may be combined in any order, and are combined typically prior to contacting with the monomer.

Monomers useful herein include substituted or unsubstituted C$_2$ to C$_{40}$ alpha olefins, preferably, C$_2$ to C$_{20}$ alpha olefins, preferably, C$_2$ to C$_{12}$ alpha olefins, preferably, ethylene, propylene, butene, pentene, hexene, heptene, octene, nonene, decene, undecene, dodecene and isomers thereof. In a preferred embodiment of the invention, the monomers comprises ethylene and optional comonomers comprising one or more C$_3$ to C$_{40}$ olefins, preferably, C$_4$ to C$_{20}$ olefins, or preferably, C$_6$ to C$_{12}$ olefins. The C$_3$ to C$_{40}$ olefin monomers may be linear, branched, or cyclic. The C$_3$ to C$_{40}$ cyclic olefins may be strained or unstrained, monocyclic or polycyclic, and may, optionally, include heteroatoms and/or one or more functional groups.

Exemplary C$_3$ to C$_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In a preferred embodiment, one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

Preferred diolefin monomers useful in this invention include any hydrocarbon structure, preferably, C$_4$ to C$_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment, the process of the invention relates to the polymerization of ethylene and at least one comonomer having from 3 to 8 carbon atoms, preferably, 4 to 8 carbon atoms. Particularly, the comonomers are propylene, butene-1,4-methyl-pentene-1,3-methyl-pentene-1, hexene-1 and octene-1, the most preferred being hexene-1, butene-1 and octene-1.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include noncoordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably, aromatics are present in the solvent at less than 1 wt %, preferably, less than 0.5 wt %, preferably, less than 0 wt % based upon the weight of the solvents.

In a preferred embodiment, the feed concentration of the monomers and comonomers for the polymerization is 60 vol % solvent or less, preferably, 40 vol % or less, or preferably, 20 vol % or less, based on the total volume of the feedstream. Preferably, the polymerization is run in a bulk process.

Preferred polymerizations can be run at any temperature and/or pressure suitable to obtain the desired polymers. Typical temperatures and/or pressures include a temperature in the range of from about 0° C. to about 300° C., preferably, about 20° C. to about 200° C., preferably, about 35° C. to about 150° C., preferably, from about 40° C. to about 120° C., preferably, from about 45° C. to about 80° C.; and at a pressure in the range of from about 0.35 MPa to about 10 MPa, preferably, from about 0.45 MPa to about 6 MPa, or preferably, from about 0.5 MPa to about 4 MPa.

In a typical polymerization, the run time of the reaction is up to 300 minutes, preferably, in the range of from about 5 to 250 minutes, or preferably, from about 10 to 120 minutes.

In a some embodiments, hydrogen is present in the polymerization reactor at a partial pressure of 0.001 to 50 psig (0.007 to 345 kPa), preferably, from 0.01 to 25 psig (0.07 to 172 kPa), more preferably, 0.1 to 10 psig (0.7 to 70 kPa).

In an alternate embodiment, the activity of the catalyst is at least 800 gpolymer/gsupported catalyst/hour, preferably, 1,000 or more gpolymer/gsupported catalyst/hour, preferably, 100 or more gpolymer/gsupported catalyst/hour, preferably, 1,600 or more gpolymer/gsupported catalyst/hour.

In a preferred embodiment, little or no scavenger is used in the process to produce the ethylene polymer. Preferably, scavenger (such as tri-alkyl aluminum) is present at zero mol %, alternately the scavenger is present at a molar ratio of scavenger metal to transition metal of less than 100:1, preferably, less than 50:1, preferably, less than 15:1, preferably, less than 10:1.

In a preferred embodiment, the polymerization: 1) is conducted at temperatures of 0 to 300° C. (preferably, 25 to 150° C., preferably, 40 to 120° C., preferably, 45 to 80° C.); 2) is conducted at a pressure of atmospheric pressure to 10 MPa (preferably, 0.35 to 10 MPa, preferably, from 0.45 to 6 MPa, preferably, from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably, where aromatics are preferably, present in the solvent at less than 1 wt %, preferably, less than 0.5 wt %, preferably, at 0 wt % based upon the weight of the solvents); 4) the polymerization preferably, occurs in one reaction zone; and 5) optionally, hydrogen is present in the polymerization reactor at a partial pressure of 0.001 to 50 psig (0.007 to 345 kPa) (preferably, from 0.01 to 25 psig (0.07 to 172 kPa), more preferably, 0.1 to 10 psig (0.7 to 70 kPa)).

A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension, including diluent, is intermittently or continuously removed from the reactor where the volatile components are separated from the polymer and recycled, optionally, after a distillation, to the reactor. The liquid diluent employed in the polymerization medium is typically an alkane having from 3 to 7 carbon atoms, preferably, a branched alkane. The medium employed should be liquid under the conditions of polymerization and relatively inert. When a propane medium is used, the process must be operated above the reaction diluent critical temperature and pressure. Preferably, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is well known in the art, and described in, for instance, U.S. Pat. No. 3,248,179, which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment, 500 ppm or less of hydrogen is added, or 400 ppm or less or 300 ppm or less. In other embodiments, at least 50 ppm of hydrogen is added, or 100 ppm or more, or 150 ppm or more.)

The reactor may be maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, preferably, methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Polyolefin Products

This invention also relates to compositions of matter produced by the methods described herein.

In a preferred embodiment, the process described herein produces ethylene homopolymers or ethylene copolymers, such as ethylene-alphaolefin (preferably, $C_3$ to $C_{20}$) copolymers (such as ethylene-butene copolymers, ethylene-hexene and/or ethylene-octene copolymers) having: a Mw/Mn of greater than 1 to 4 (preferably, greater than 1 to 3).

Likewise, the process of this invention produces ethylene copolymers. In a preferred embodiment, the copolymers produced herein have from 0 to 25 mol % (alternately from 0.5 to 20 mol %, alternately from 1 to 15 mol %, preferably, from 3 to 10 mol %) of one or more $C_3$ to $C_{20}$ olefin comonomer (preferably, $C_3$ to $C_{12}$ alpha-olefin, preferably, propylene, butene, hexene, octene, decene, dodecene, preferably, propylene, butene, hexene, octene).

In a preferred embodiment, the monomer is ethylene and the comonomer is hexene, preferably, from 1 to 15 mol % hexene, alternately 1 to 10 mol %.

Typically, the polymers produced herein have an Mw of 5,000 to 1,000,000 g/mol (preferably, 25,000 to 750,000 g/mol, preferably, 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated Mw, Mn, MWD are determined by GPC as described in the Experimental section below.

In a preferred embodiment the polymer produced herein has a composition distribution breadth index (CDBI) of 50% or more, preferably, 60% or more, preferably, 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441, (1982), and U.S. Pat. No. 5,008,204, including that fractions having a weight average molecular weight (Mw) below 15,000 are ignored when determining CDBI.

In another embodiment, the polymer produced herein has two peaks in the TREF measurement (see below). Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably, at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). Bimodal CD may also be determined by other methods known to those skilled in the art. One such alternate method for TREF measurement then can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491-499, (1994).

TREF Method

Figure 3:
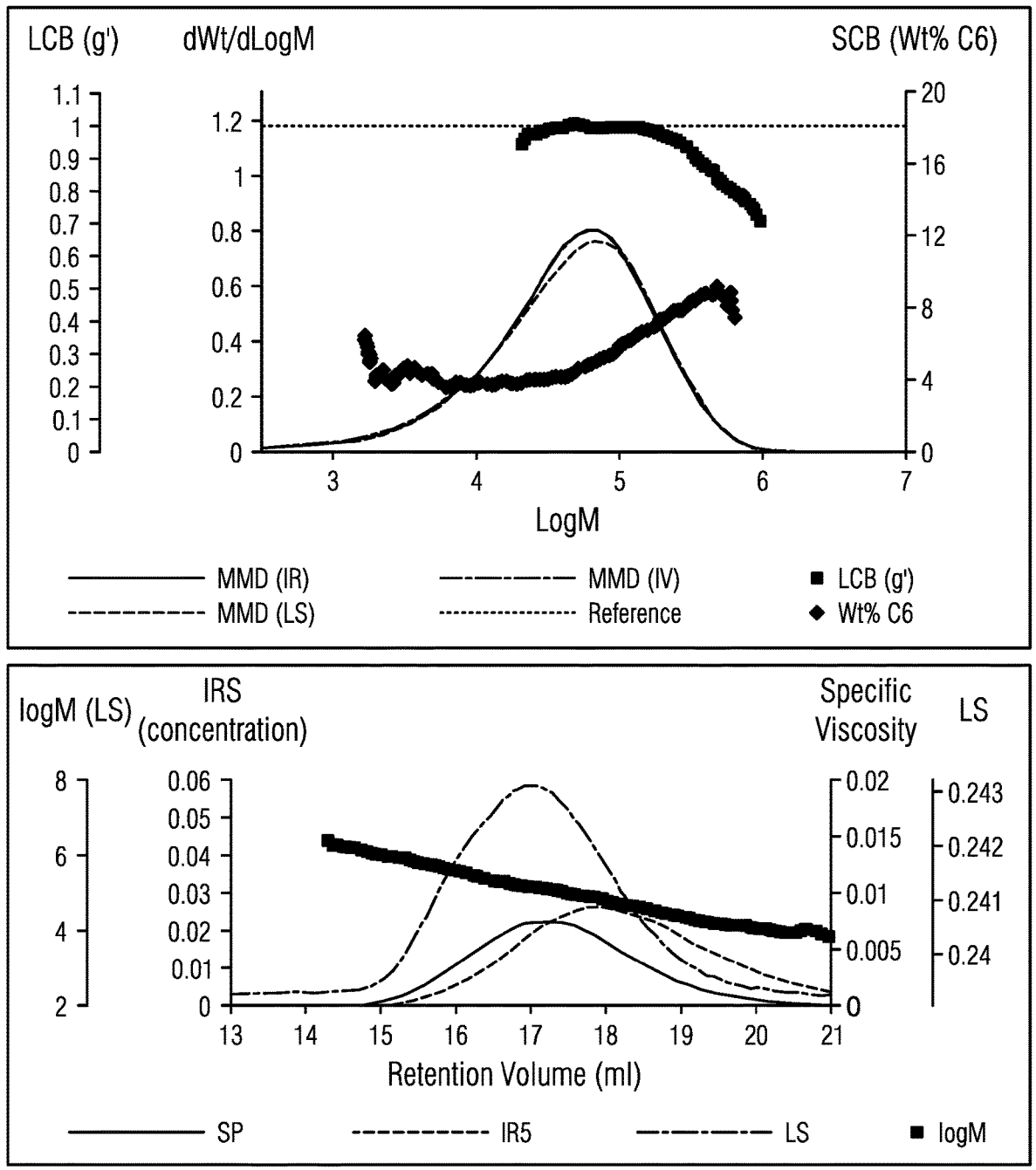
FIG. 3 is a GPC of LLDPE produced with supported catalyst C in Example 2.
Figure 4:
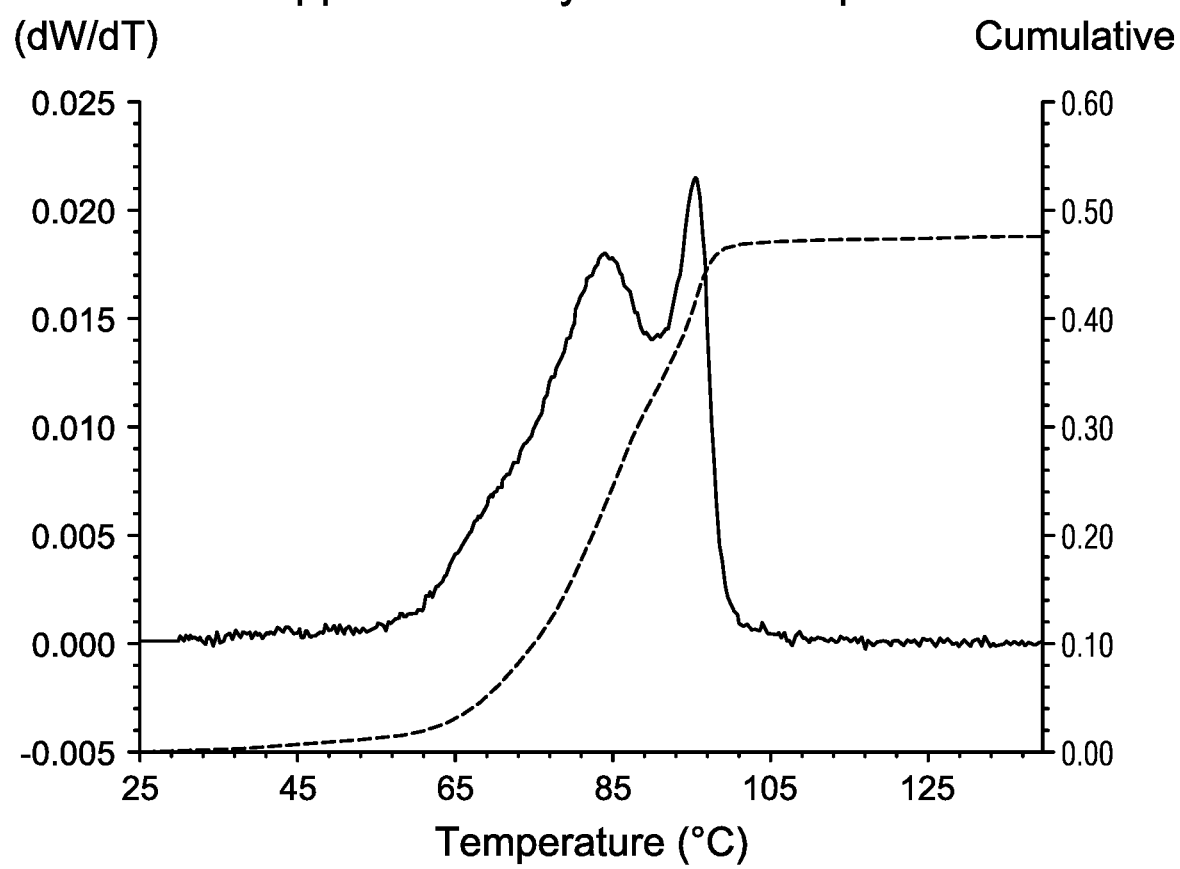
FIG. 4 is a TREF of LLDPE produced with supported catalyst B in Example 2.

Temperature Rising Elution Fractionation (TREF) analysis is done using a CRYSTAF-TREF 200+ instrument from Polymer Char, S. A., Valencia, Spain. The principles of TREF analysis and a general description of the particular apparatus to be used are given in the article Monrabal, B.; del Hierro, P. Anal. Bioanal. Chem. 2011, 399, 1557. FIG. 3 of the article is an appropriate schematic of the particular apparatus used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

1,2-Dichlorobenzene (ODCB) solvent stabilized with approximately 380 ppm of 2,6-bis(1,1-dimethylethyl)-4-methylphenol (butylated hydroxytoluene) is used for preparing the sample solution and for elution. The sample to be analyzed (approximately 25 mg but as low as approximately 10 mg) is dissolved in ODCB (25 ml metered at ambient temperature) by stirring at 150° C. for 60 min. A small volume (0.5 ml) of the solution is introduced into a column (15-cm long by 3/8" o.d.) packed with an inert support (of stainless steel balls) at 150° C., and the column temperature is stabilized at 140° C. for 45 min. The sample volume is then allowed to crystallize in the column by reducing the temperature to 30° C. at a cooling rate of 1° C./min. The column is kept at 30° C. for 15 min. before injecting the ODCB flow (1 ml/min) into the column for 10 min. to elute and measure the polymer that did not crystallize (soluble fraction). The infrared detector used (Polymer Char IR4) generates an absorbance signal that is proportional to the concentration of polymer in the eluting flow. A complete TREF curve is then generated by increasing the temperature of the column from 30 to 140° C. at a rate of 2° C./min. while maintaining the ODCB flow at 1 ml/min. to elute and measure the dissolving polymer.

Blends

In another embodiment, the polymer (preferably, the ethylene-hexene copolymer) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably, the polyethylene produced herein) is present in the above blends, at from 10 to 99 wt %, based upon the weight of the polymers in the blend, preferably, 20 to 95 wt %, even more preferably, at least 30 to 90 wt %, even more preferably, at least 40 to 90 wt %, even more preferably, at least 50 to 90 wt %, even more preferably, at least 60 to 90 wt %, even more preferably, at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing ethylene copolymers or blends thereof, may be used in a variety of end-use applications. Such applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then, optionally, the combination could be oriented even further. Typically, the films are oriented in the Machine Direction (MD) at a ratio of up to 15, preferably, between 5 and 7, and in the Transverse Direction (TD) at a ratio of up to 15, preferably, 7 to 9. However, in another embodiment, the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Experimental

Room temperature is 23° C. unless otherwise noted.

MAO is methyl alumoxane (30 wt % in toluene) obtained from Albemarle.

Gel Permeation Chromatography with Three Detectors (GPC-3D)

Mw, Mn, and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hrs. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hrs. before injecting the first sample. The LS laser is turned on at least 1 to 1.5 hrs. before running the samples. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in $g/cm^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'vis = \frac{[\eta]_{avg}}{kM_v^\alpha}$$

$M_v$ is the viscosity-average molecular weight based on molecular weights determined by LS analysis. Z average branching index ($g'_{Zave}$) is calculated using Ci=polymer concentration in the slice i in the polymer peak times the mass of the slice squared, $M_i^2$.

All molecular weights are weight average unless otherwise noted. All molecular weights are reported in g/mol unless otherwise noted.

Molecular Weight and Comonomer Composition Determination with PolymerChar GPC-IR The distribution and the moments of molecular weight (Mw, Mn, Mw/Mn, etc.) and the comonomer content (C2, C3, C6, etc.), are determined with a high temperature Gel Permeation Chromatography (PolymerChar GPC-IR) equipped with a multiple-channel band filter based Infrared detector ensemble IR5, in which a broad-band channel is used to measure the polymer concentration while two narrow-band channels are used for characterizing composition. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min. and the nominal injection volume is 200 μL. The whole system including transfer lines, columns, detectors are contained in an oven maintained at 145° C. Given amount of polymer sample is weighed and sealed in a standard vial with 10 μL flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hrs. for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IR5 broadband signal, I, using the following equation:

$$c = \alpha I$$

where α is the mass constant determined with PE or PP standards. The mass recovery is calculated from the ratio of the integrated area of the concentration chromatography over elution volume and the injection mass which is equal to the pre-determined concentration multiplied by injection loop volume.

The molecular weight is determined by combining universal calibration relationship with the column calibration which is performed with a series of monodispersed polystyrene (PS) standards. The MW is calculated at each elution volume with the following equation.

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. In this method, $\alpha_{PS}$=0.67 and $K_{PS}$=0.000175 while $\alpha_X$ and $K_X$ are obtained from published literature. Specifically, α/K=0.695/0.000579 for PE and 0.705/0.0002288 for PP.

The comonomer composition is determined by the ratio of the IR detector intensity corresponding to $CH_2$ and $CH_3$ channel calibrated with a series of PE and PP homo/copolymer standards whose nominal value are predetermined by NMR or FTIR.

CRC was performed according to the following procedure: Cross-fractionation chromatography (CFC) analysis was done using a CFC-2 instrument from Polymer Char, S. A., Valencia, Spain. The principles of CFC analysis and a general description of the particular apparatus used are given in the article Ortin, A.; Monrabal, B.; Sancho-Tello, J. Macromol. Symp. 2007, 257, 13. FIG. 1 of the article is an appropriate schematic of the particular apparatus used. Pertinent details of the analysis method and features of the apparatus used are as follows.

1,2-Dichlorobenzene (ODCB) solvent stabilized with approximately 380 ppm of 2,6-bis(1,1-dimethylethyl)-4-methylphenol (butylated hydroxytoluene) was used for preparing the sample solution and for elution. The sample to be analyzed (approximately 50 mg) was dissolved in ODCB (25 ml metered at ambient temperature) by stirring (200 rpm) at 150° C. for 75 min. A small volume (0.5 ml) of the solution was introduced into a TREF column (stainless steel; o.d., ⅜"; length, 15 cm; packing, non-porous stainless steel micro-balls) at 150° C., and the column temperature was stabilized for 30 min. at a temperature (120-125° C.) approximately 20° C. higher than the highest-temperature fraction for which the GPC analysis was included in obtaining the final bivariate distribution. The sample volume was then allowed to crystallize in the column by reducing the temperature to 30° C. at a cooling rate of 0.2° C./min. The low temperature was held for 10 min. before injecting the solvent flow (1 ml/min) into the TREF column to elute the soluble fraction (SF) into the GPC columns (3×PLgel 10 μm Mixed-B 300×7.5 mm, Varian, Inc.); the GPC oven was held at high temperature (140° C.). The SF was eluted for 5 min. from the TREF column and then the injection valve was put in the "load" position for 40 min. to completely elute all of the SF through the GPC columns (standard GPC injections). All subsequent higher-temperature fractions were analyzed using overlapped GPC injections wherein at each temperature step the polymer was allowed to dissolve for at least 16 min. and then injected from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages (Mn, Mw, etc.) of eluting polymer fractions. Thirteen narrow molecular-weight distribution polystyrene standards (obtained from Polymer Labs, UK) within the range of 1.5-8200 kg/mol were used to generate a universal calibration curve. Mark-Houwink parameters were obtained from Appendix I of Mori, S.; Barth, H. G. Size Exclusion Chromatography; Springer, 1999. For polystyrene K=1.38×10−4 dl/g and α=0.7; and for polyethylene K=5.05×10−4 dl/g and α=0.693 were used. For a polymer fraction, which eluted at a temperature step, that has a weight fraction (wt % recovery) of less than 0.5%, the MWD and the molecular-weight averages were not computed; additionally, such polymer fractions were not included in computing the MWD and the molecular-weight averages of aggregates of fractions.

Example 1

Synthesis of Bridged Monocyclopentadienyl Titanium Transition Metal Compounds.

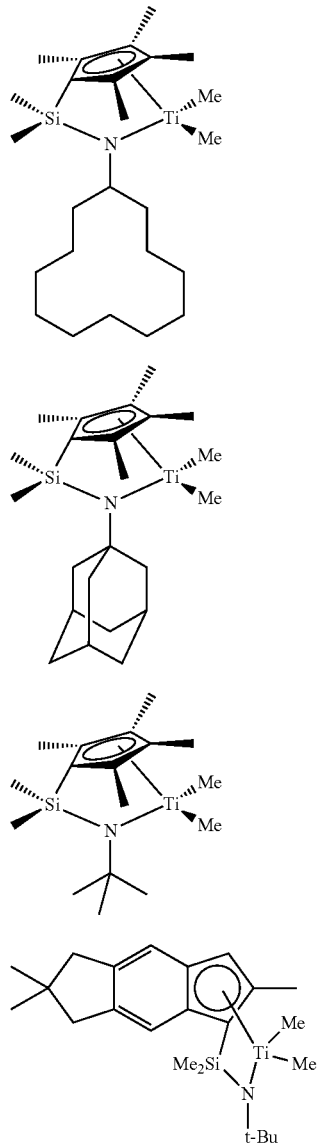

Complex A can be prepared as described in US RE 37,788. Complex B can be prepared as described in U.S. Pat. No. 5,955,625. Complex C can be purchased from Austin Chemical Company Inc., Buffalo Grove, Ill. or can be prepared via known literature routes. Complex D is prepared as follows:

2-bromo-2-methylpropionyl bromide (Aldrich), $AlCl_3$ (Merck), $NaBH_4$ (Aldrich), TsOH (Aldrich), dichlorodimethylsilane (Merck), tert-butylamine (Merck), 2.5 M $^n$BuLi in hexanes (Chemetall GmbH), MeMgBr in ether (Aldrich), $TiCl_4(THF)_2$ (Aldrich), 2-methylindan-1-one (Aldrich),), iodomethane (Acros), $K_2CO_3$ (Merck), $Na_2SO_4$ (Akzo Nobel), hydrazine hydrate (Merck), ethylene glycol (Merck), KOH (Merck), 37% hydrochloric acid (Merck), potassium tert-butoxide (Acros), methanol (Merck), dichloromethane (Merck), hexane (Merck), toluene (Merck), silica gel 60 (40-63 um; Merck), and $CDCl_3$ (Deutero GmbH) were used as received. THF (Merck) and diethyl ether (Merck; ether) freshly distilled from benzophenone ketyl were used for organometallic synthesis and catalysis.

Synthesis of Pre-Catalyst D

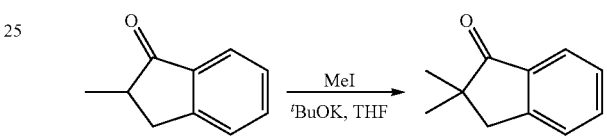

To a solution of 176 g (1.21 mol) of 2-methylindan-1-one and 205 g (1.44 mol, 1.2 eq.) of MeI in 200 ml of THF cooled to 0° C., a solution of 176 g (1.57 mol, 1.3 eq.) of $^t$BuOK in 1200 ml of THF was added dropwise for 4 hrs. The reaction mixture was stirred overnight at room temperature and then poured into 2 liters of water. Crude product was extracted with 300 ml of hexane and then 2×300 ml of dichloromethane. The combined organic extract was dried over $K_2CO_3$, passed through a short pad of silica gel 60 (40-63 um), and the eluent was evaporated to dryness to give red oil. This oil was then distilled in vacuum to give 185 g (96%) of 2,2-dimethylindan-1-one as yellowish oil, which crystallizes at room temperature, b.p. 76-78° C./5 mm Hg.

Anal. calc. for $C_{11}H_{12}O$: C, 82.46; H, 7.55. Found: C, 82.24; H, 7.61.

$^1$H NMR ($CDCl_3$): δ 7.76 (d, 1H, J=7.6 Hz), 7.59 (dt, 1H, J=7.6, 1.2 Hz), 7.44-7.35 (m, 2H), 3.00 (s, 2H), 1.24 (s, 6H). $^{13}$C{$^1$H} NMR ($CDCl_3$): δ 211.38, 152.18, 135.30, 134.77, 127.37, 126.59, 124.40, 45.43, 42.81, 25.22.

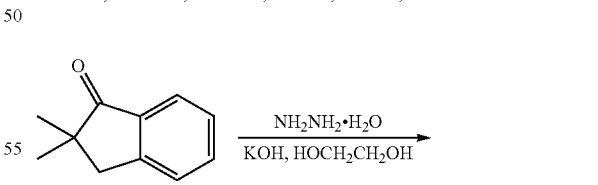

A mixture of 129 g (~2.3 mol) of KOH, 182.5 g (1.14 mol) of 2,2-dimethylindan-1-one and 144 ml of hydrazine hydrate in 850 ml of ethylene glycol was refluxed for 5 hrs. Then, the reflux condenser was replaced by a Claisen distillation head with condenser, and a mixture of $H_2O$, $NH_2NH_2$, product and ethylene glycol was distilled off until the distillation temperature reached 195° C. The residue was then allowed to cool to room temperature, 300 ml of ethylene glycol, second portion of 2,2-dimethylindan-1-one (182.5 g, 1.139 mol) and hydrazine hydrate (144 ml) was added, and the reduction procedure was repeated as described above. Upper layer of the combined distillate (from two successive reductions) was separated, and the aqueous phase was diluted with 1,000 ml of water. Crude product was extracted with 3×300 ml of dichloromethane. The combined organic extract was washed by 1 M HCl, dried over $K_2CO_3$, passed through a short pad of silica gel 60 (40-63 um), and the elute was evaporated to dryness. The residue was distilled in vacuum to give 290 g (87%) of 2,2-dimethylindane as colorless liquid, b.p. 73.5° C./20 mm Hg.

Anal. calc. for $C_{11}H_{14}$: C, 90.35; H, 9.65. Found: C, 90.50; H, 9.73.

$^1$H NMR (CDCl$_3$): δ 7.19-7.08 (m, 4H, Ar—H), 2.72 (s, 4H, 2×CH$_2$ in indanyl), 1.15 (s, 6H, 2×CH$_3$ in indanyl). $^{13}$C{$^1$H} NMR (CDCl$_3$): δ 143.51, 125.93, 124.70, 47.70, 40.05, 28.77.

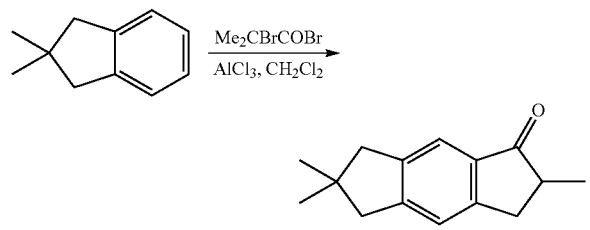

To a suspension of 420 g (3.15 mol, 2.66 eq.) of AlCl$_3$ in 400 ml of dichloromethane cooled to −40° C., 273 g (1.19 mol) of 2-bromo-2-methylpropionyl bromide and a solution of 173.5 g (1.19 mol) of 2,2-dimethylindane in 300 ml of dichloromethane were subsequently added for 30 min. The cooling bath was then removed, and the solution was stirred overnight at room temperature. The reaction mixture was poured into 2 kg of crushed ice, the organic phase was separated, and the water phase was extracted with 3×500 ml of dichloromethane. The combined organic extract was washed with aqueous $K_2CO_3$, dried over anhydrous $K_2CO_3$, passed through a short pad of silica gel 60 (40-63 um), and the eluent was evaporated to dryness to give a yellow oil. This oil was distilled in vacuum to give 245 g (96%) of 2,6,6-trimethyl-3,5,6,7-tetrahydro-s-indacen-1(2H)-one (on the evidence of NMR spectroscopy, this oil includes ca. 85-90% of the desired product) as slightly yellowish oil which crystallizes rapidly at room temperature, b.p. 153-165° C./1 mm Hg. This crude product was then re-crystallized from 700 ml of hot hexane. Crystals precipitated from this solution for one week at +5° C. were collected and dried in vacuum. This procedure gave 191 g (75%) of pure 2,6,6-trimethyl-3,5,6,7-tetrahydro-s-indacen-1(2H)-one as white crystalline solid. The mother liquor was evaporated to dryness to give 52.4 g of a ca. 1:1 mixture of the isomeric linear and angular indanones.

Anal. calc. for $C_{15}H_{18}O$: C, 84.07; H, 8.47. Found: C, 84.42; H, 8.60.

$^1$H NMR (CDCl$_3$): δ 7.52 (s, 1H, Ar—H), 7.21 (s, 1H, Ar—H), 3.32 (dd, 1H, J=16.5 Hz, J=7.1 Hz, 3-H in indan-1-one), 2.75, 2.73 (2×s, 4H, 2×CH$_2$ in indanyl), 2.77-2.58 (m, 2H, 2,3'-H in indan-1-one), 1.29 (d, 3H, J=7.3 Hz, 2-Me in indan-1-one), 1.15 (s, 6H, 2×CH$_3$ in indanyl). $^{13}$C{$^1$H} NMR (CDCl$_3$): δ 208.99, 152.64, 152.40, 143.51, 135.08, 122.43, 119.65, 47.78, 46.77, 42.28, 40.65, 34.74, 28.44, 16.44.

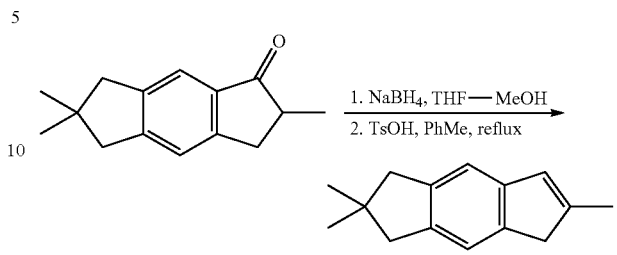

To a solution of 99.1 g (463 mmol) of 2,6,6-trimethyl-3,5,6,7-tetrahydro-s-indacen-1(2H)-one in 450 ml of THF cooled to 5° C., 26.3 g (695 mmol) of NaBH$_4$ was added. Further on, 225 ml of methanol was added dropwise by vigorous stirring for ca. 5 h at 5° C. The resulting mixture was stirred for 3 hrs. at room temperature and then evaporated to dryness. The residue was partitioned between 500 ml of dichloromethane and 500 ml of 2 M HCl. The organic layer was separated, and the aqueous layer was extracted with 100 ml of dichloromethane. The combined organic extract was evaporated to dryness to give colorless oil. To a solution of this oil in 1000 ml of toluene 1 g of TsOH was added, and this mixture was refluxed with Dean-Stark head for 20 min, then cooled to room temperature using a water bath. The resulting solution was washed by 10% aqueous Na$_2$CO$_3$. The organic layer was separated, and the aqueous layer was extracted with 2×100 ml of dichloromethane. The combined organic extract was dried over $K_2CO_3$ and then passed through a short pad of silica gel 60 (40-63 um). The silica gel pad was additionally washed by 100 ml of dichloromethane. The combined organic elute was evaporated to dryness to yield yellowish liquid. This crude product was distilled in vacuum to give 77.7 g (85%) of 2,2,6-trimethyl-1,2,3,5-tetrahydro-s-indacene as yellowish oil, which crystallizes rapidly at room temperature, b.p. 144-148° C./10 mm Hg.

Anal. calc. for $C_{15}H_{18}$: C, 90.85; H, 9.15. Found: C, 90.60; H, 9.04.

$^1$H NMR (CDCl$_3$): δ 7.14 (s, 1H, Ar—H), 7.03 (s, 1H, Ar—H), 6.41 (bs, 1H, vinylic Cp-H in indenyl), 3.21 (s, 2H, benzylic CH$_2$ in indenyl), 2.70 (s, 4H, 2×CH$_2$ in indanyl), 2.11 (s, 3H, 2-Me in indenyl), 1.14 (s, 6H, 2×CH$_3$ in indanyl). $^{13}$C{$^1$H} NMR (CDCl$_3$): δ 144.83, 144.22, 141.58, 141.35, 138.85, 127.08, 119.94, 116.08, 47.58, 47.53, 42.22, 40.25, 28.88, 16.79.

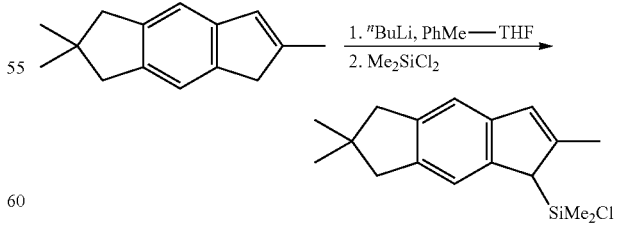

To a solution of 9.92 g (50.0 mmol) of 2,2,6-trimethyl-1,2,3,5-tetrahydro-s-indacene in 200 ml of toluene, 20.0 ml (50.0 mmol) of 2.5 M $^n$BuLi in hexanes was added at room temperature. The resulting viscous solution was stirred for 3 hrs., and then 20 ml of THF was added. The resulting suspension was stirred for 1 hr. at 60° C., then cooled to −30° C., and 20 ml (21.4 g, 166 mmol, 3.3 eq.) of dichlorodimethylsilane was added in one portion. The formed solution was refluxed for 1 h, then filtered through glass frit (G3). The precipitate was additionally washed by 50 ml of toluene. The combined filtrate was evaporated to dryness to give 14.7 g (~100%) of chloro(dimethyl)(2,6,6-trimethyl-1,5,6,7-tetrahydro-s-indacen-1-yl)silane as viscous yellowish oil, which was further used without an additional purification.

Anal. calc. for $C_{17}H_{23}ClSi$: C, 70.19; H, 7.97. Found: C, 70.44; H, 8.20.

$^1$H NMR (CDCl$_3$): δ 7.25 (s, 1H, Ar—H), 7.12 (s, 1H, Ar—H), 6.56 (s, 1H, vinylic Cp-H in indenyl), 3.49 (s, 1H, benzylic Cp-H in indenyl), 2.85-2.65 (m, 4H, C$_5$H$_4$Me$_2$), 2.26 (s, 3H, 2-Me), 1.19, 1.14 (2×s, 2×3H, C$_5$H$_4$Me$_2$), 0.40, 0.15 (2×s, 2×3H, SiMe$_2$Cl). $^{13}$C{$^1$H} NMR (CDCl$_3$): δ 144.41, 143.72, 141.26, 140.71, 138.70, 127.40, 119.94, 116.26, 49.33, 47.64, 47.55, 40.40, 28.85, 17.57, 1.07, −0.62.

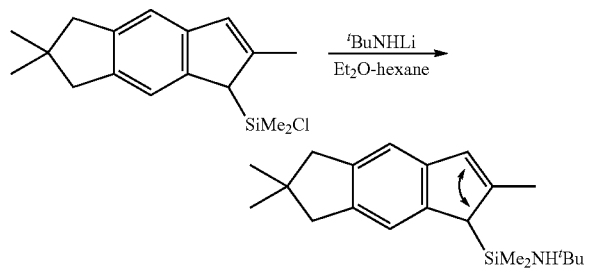

To a solution of 6.30 ml (4.39 g, 60 mmol, 1.2 eq.) of tert-butylamine in 150 ml of ether cooled to −50° C., 20 ml (50 mmol) of 2.5 M $^n$BuLi in hexanes was added. The reaction mixture was stirred for 4 hrs. at room temperature, and to the formed suspension cooled to −78° C. a solution of 14.7 g (50 mmol) of chloro(dimethyl)(2,6,6-trimethyl-1,5,6,7-tetrahydro-s-indacen-1-yl)silane in 150 ml of ether was added. The resulting mixture was allowed to warm to room temperature and stirred overnight. Then, it was evaporated to dryness, and the residue was dissolved in 250 ml of toluene. This solution was filtered through glass frit (G3), and the precipitate was additionally washed by 50 ml of toluene. The filtrate was concentrated under vacuum to give viscous yellowish oil (15.6 g, 95%). On the evidence of NMR spectroscopy, this oil consists of two isomeric compounds, i.e., N-(tert-butyl)-1,1-dimethyl-1-(2,6,6-trimethyl-1,5,6,7-tetrahydro-s-indacen-1-yl)silanamine (allylic isomer, ca. 70%) and N-(tert-butyl)-1,1-dimethyl-1-(2,6,6-trimethyl-3,5,6,7-tetrahydro-s-indacen-1-yl)silanamine (vinylic isomer, ca. 30%).

Anal. calc. for $C_{21}H_{33}NSi$: C, 77.00; H, 10.15; N, 4.28. Found: C, 77.29; H, 10.40; N, 4.01.

N-(tert-butyl)-1,1-dimethyl-1-(2,6,6-trimethyl-1,5,6,7-tetrahydro-s-indacen-1-yl)silanamine (allylic isomer): $^1$H NMR (CDCl$_3$): δ 7.32 (s, 1H, Ar—H), 7.19 (s, 1H, Ar—H), 6.58 (s, 1H, vinylic Cp-H in indenyl), 3.39 (s, 1H, benzylic Cp-H in indenyl), 2.95-2.75 (m, 4H, C$_5$H$_4$Me$_2$), 2.35 (s, 3H, 2-Me), 1.35-1.21 (m, 15H, Bu +C$_5$H$_4$Me$_2$), 0.68 (bs, 1H, NH), 0.24, 0.04 (2×s, 2×3H, SiMe$_2$).

N-(tert-butyl)-1,1-dimethyl-1-(2,6,6-trimethyl-3,5,6,7-tetrahydro-s-indacen-1-yl)silanamine (vinylic isomer): $^1$H NMR (CDCl$_3$): δ 7.54 (s, 1H, Ar—H), 7.27 (s, 1H, Ar—H), 3.40 (s, 2H, benzylic Cp-H in indenyl), 2.95-2.75 (m, 4H, C$_5$H$_4$Me$_2$), 2.36 (s, 3H, 2-Me), 1.35-1.21 (m, 15H, Bu +C$_5$H$_4$Me$_2$), 0.89 (bs, 1H, NH), 0.54 (s, 6H, SiMe$_2$).

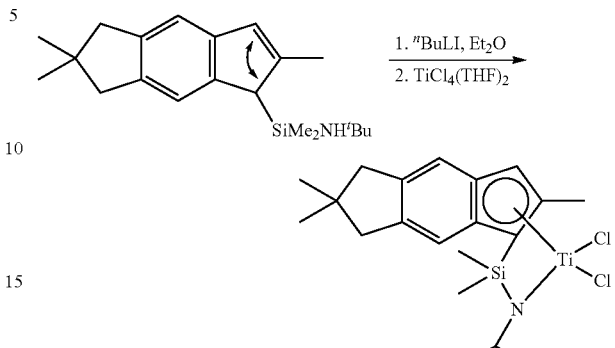

To a solution of 15.6 g (47.6 mmol) of N-(tert-butyl)-1,1-dimethyl-1-(2,6,6-trimethyl-tetrahydro-s-indacen-1-yl)silanamine (prepared above) in 200 ml of ether, 40.0 ml (100 mmol) of 2.5 M $^n$BuLi in hexanes was added in one portion at −78° C. This mixture was stirred for 4 hrs. at room temperature, the resulting reddish solution was cooled to −78° C. and 16.7 g (50.0 mmol) of TiCl$_4$(THF)$_2$ was added in one portion. The formed mixture was stirred for 24 hrs. at room temperature and then evaporated to dryness. The residue was extracted with 200 ml of warm toluene, and the formed hot suspension was filtered through glass frit (G3). The precipitate was additionally washed by 2×50 ml of hot toluene. The combined filtrate was evaporated to dryness, and the residue was extracted with 4×100 ml of warm hexane. The combined organic extract was evaporated to ca. 250 ml. Crystals precipitated from this solution overnight at room temperature were collected, washed by 10 ml of cold hexane, and dried in vacuum. This procedure gave 8.39 g (40%) of Me$_2$Si(η$^5$-2,6,6-trimethyl-1,5,6,7-tetrahydro-s-indacen-1-yl)(η$^1$-N$^t$Bu)TiCl$_2$. The mother liquor was concentrated to ca. 100 ml. Again, crystals precipitated from this solution overnight at room temperature were collected, washed by 10 ml of cold hexane, and dried in vacuum. This procedure gave 2.71 g (13%) of the target complex. Thus, the total yield of Me$_2$Si(η$^5$-2,6,6-trimethyl-1,5,6,7-tetrahydro-s-indacen-1-yl)(η$^1$-N$^t$Bu)TiCl$_2$ was 53%.

Anal. calc. for $C_{21}H_{31}Cl_2NSiTi$: C, 56.76; H, 7.03; N, 3.15. Found: C, 56.90; H, 7.18; N, 2.97.

$^1$H NMR (CDCl$_3$): δ 7.46 (s, 1H, Ar—H), 7.40 (s, 1H, Ar—H), 7.02 (s, 1H, Cp-H in indenyl), 2.85-2.67 (m, 4H, C$_5$H$_4$Me$_2$), 2.34 (s, 3H, 2-Me), 1.38 (s, 9H, Bu ), 1.145, 1.138 (2×s, 2×3H, C$_5$H$_4$Me$_2$), 0.90, 0.76 (2×s, 2×3H, SiMe$_2$).

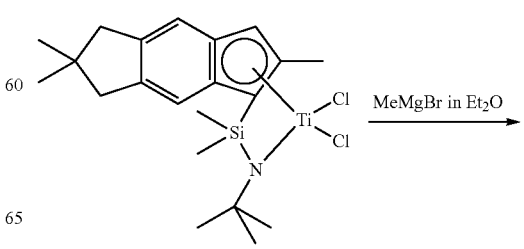

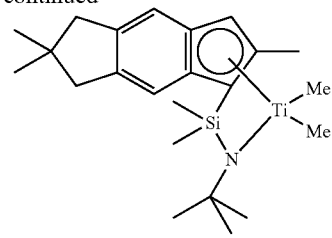

To a suspension of 8.39 g (35.9 mmol) of Me$_2$Si($\eta^5$-2,6,6-trimethyl-1,5,6,7-tetrahydro-s-indacen-1-yl)($\eta^1$-N$^t$Bu)TiCl$_2$ in 150 ml of ether cooled to −30° C., 28 ml (59.1 mmol, 3.1 eq.) of 2.11 M MeMgBr in ether was added in one portion. The reaction mixture was stirred overnight at room temperature and then evaporated to dryness. The residue was extracted with 4×50 ml of warm hexane. The combined extract was evaporated to a. 30 ml and then filtered through glass frit (G3). Crystals precipitated from this filtrate overnight at −30° C. were collected, washed by 2×10 ml of cold (−30° C.) hexane, and dried in vacuum. This procedure gave 4.53 g (11.2 mmol, 60%) of Me$_2$Si($\eta^5$-2,6,6-trimethyl-1,5,6,7-tetrahydro-s-indacen-1-yl)-($\eta^1$-N$^t$Bu)TiMe$_2$. The mother liquor was concentrated to ca. 10 ml. Crystals precipitated from this solution overnight at −30° C. were collected, washed by 10 ml of cold (−30° C.) hexane, and dried in vacuum. This procedure gave 1.45 g (19%) of the target complex. Thus, the total yield of Me$_2$Si($\eta^5$-2,6,6-trimethyl-1,5,6,7-tetrahydro-s-indacen-1-yl)($\eta^1$-N$^t$Bu)TiMe$_2$ was 79%.

Anal. calc. for C$_{23}$H$_{37}$NSiTi: C, 68.46; H, 9.24; N, 3.47. Found: C, 68.19; H, 9.36; N, 3.41.

$^1$H NMR (CDCl$_3$): δ 7.42 (s, 1H, Ar—H), 7.22 (s, 1H, Ar—H), 6.94 (s, 1H, Cp-H in indenyl), 2.75 (s, 2H, C$_5$H$_4$Me$_2$), 2.69 (d, 1H, J=15.47, C$_5$H$_4$Me$_2$), 2.625 (d, 1H, J=15.47, C$_5$H$_4$Me$_2$), 2.13 (s, 3H, 2-Me), 1.50 (s, 9H, Bu), 1.13, 1.11 (2×s, 2×3H, C$_5$H$_4$Me$_2$), 0.65, 0.56 (2×s, 2×3H, SiMe$_2$), 0.5, −0.52 (2×s, 2×3H, TiMe$_2$).

Preparation of Fluorided Silica.

a) Preparation of Fluorided Silica-1 Via Dry Mixing.

50 g of Grace Davison D948™ silica and 2.3 g (NH$_4$)$_2$SiF$_6$ (12.9 mmol, 1.55 mmol F/g silica) were combined in a plastic jar. The mixture was tumbled together for 1 hour. The solid mixture was transferred into a tube furnace, and was heated to 200° C. under constant nitrogen flow (temperature program: 25° C./hr. ramped to 150° C.; held at 150° C. for 4 hrs.; 50° C./hr. ramped to 200° C.; held at 200° C. for 4 hrs.; cooled down to room temperature). 47 g of fluorided silica-1 was collected after the calcination.

b) Preparation of Fluorided Silica-2 Via Wet Mixing.

2.41 g (NH$_4$)$_2$SiF$_6$ (13.5 mmol, 1.62 mmol F/g silica) was dissolved in 14.7 g water in a 20 ml glass vial. 50 g of Grace Davison D948™ silica and 200 g of toluene were combined in a 250 ml Wheaton CELSTIR™. Under vigorous stirring, the aqueous stock solution of (NH$_4$)$_2$SiF$_6$ was added via a syringe to the toluene slurry of silica. The mixture was allowed to stir at room temperature for 16 hrs. The slurry was filtered through a 250 ml Optichem™ disposable polyethylene frit, rinsed with 150 ml pentane for 2 times, then dried in air overnight to yield a white, free-flowing solid. The solid was transferred into a tube furnace, and was heated under constant nitrogen flow (temperature program: 25° C./hr. ramped to 150° C.; held at 150° C. for 4 hrs.; 50° C./hr. ramped to 200° C.; held at 200° C. for 4 hrs.; cooled down to room temperature). 47.2 g of fluorided silica-2 was collected after the calcination.

c) Preparation of Fluorided Silica-3 Via Wet Mixing.

1.18 g (NH$_4$)$_2$SiF$_6$ (6.6 mmol, 0.79 mmol F/g silica) was dissolved in 7.00 g water in a 20 ml glass vial. 50 g of Grace Davison D948™ silica ("D948") and 200 g of toluene were combined in a 250 ml Wheaton CELSTIR™. Under vigorous stirring, the aqueous stock solution of (NH$_4$)$_2$SiF$_6$ was added via a syringe to the toluene slurry of silica. The mixture was allowed to stir at room temperature for 16 hrs. The slurry was filtered through a 110 ml Optichem™ disposable polyethylene frit, rinsed with 200 g pentane three times, then dried in air overnight to yield a white, free-flowing solid. The solid was transferred into a tube furnace, and was heated under constant nitrogen flow (temperature program: 25° C./hr. ramped to 150° C.; held at 150° C. for 4 hrs.; 50° C./hr. ramped to 200° C.; held at 200° C. for 4 hrs.; cooled down to room temperature). 46 g of fluorided silica-2 was collected after the calcination.

d) Preparation of Fluorided Silica-4 Via Wet Mixing.

1.18 g (NH$_4$)$_2$SiF$_6$ (6.6 mmol, 0.79 mmol F/g silica) was dissolved in 7.00 g water in a 20 ml glass vial. 50 g of Grace Davison D948™ silica and 200 g of toluene were combined in a 250 ml Wheaton CELSTIR™. Under vigorous stirring, the aqueous stock solution of (NH$_4$)$_2$SiF$_6$ was added via a syringe to the toluene slurry of silica. The mixture was allowed to stir at room temperature for 16 hrs. The slurry was filtered through a 110 ml Optichem™ disposable polyethylene frit, rinsed with 200 g pentane three times, then dried in air overnight to yield a white, free-flowing solid. The solid was transferred into a tube furnace, and was heated under constant nitrogen flow (temperature program: 100° C./hr. ramped to 200° C.; held at 200° C. for 2 hrs.; 100° C./hr. ramped to 600° C.; held at 600° C. for 6 hrs.; cooled down to room temperature).

e) Preparation of Fluorided Silica-5 Via Wet Mixing.

0.59 g (NH$_4$)$_2$SiF$_6$ (3.3 mmol, 0.40 mmol F/g silica) was dissolved in 3.5 g water in a 20 ml glass vial. 50 g of Grace Davison D948™ silica and 200 g of toluene were combined in a 250 ml Wheaton CELSTIR™. Under vigorous stirring, the aqueous stock solution of (NH$_4$)$_2$SiF$_6$ was added via a syringe to the toluene slurry of silica. The mixture was allowed to stir at room temperature for 16 hrs. The slurry was filtered through a 110 ml Optichem™ disposable polyethylene frit, rinsed with 200 g pentane three times, then dried in air overnight to yield a white, free-flowing solid. The solid was transferred into a tube furnace, and was heated under constant nitrogen flow (temperature program: 25° C./hr. ramped to 150° C.; held at 150° C. for 4 hrs.; 50° C./hrs. ramped to 200° C.; held at 200° C. for 4 hrs.; cooled down to room temperature).

Preparation of Supported MAO on Silica (sMAO).

a) sMAO from Silica-1.

In a drybox, 36 g MAO toluene solution (Albermarle, 13.6 wt % Al) and 68 g of anhydrous toluene were combined in a 125 ml Wheaton CELSTIR™. The stirring rate was set to 450 rpm. Every 5 minutes, 5 g of silica-1 was slowly added to the CELSTIR™. A total amount of 26 g of silica-1 was added over a period of 30 minutes. The resulting slurry was allowed to stir at room temperature for 15 minutes. Then the CELSTIR™ was placed in a sand bath heated to 100° C. The slurry was heated at 100° C. for an additional 3 hrs. at a stirring rate of 215 rpm. The final slurry was filtered through a 110 ml Optichem disposable polyethylene frit. The solid collected in the frit was first rinsed with 30 g toluene for 2 times, then 30 g pentane for 3 times. The solid was dried in vacuo for 3 hrs. 34.9 g of sMAO-silica-1 was obtained.

b) sMAO-Silica-2

In a drybox, 10.6 g MAO toluene solution (Albermarle, 13.6 wt % Al) and 40 g of anhydrous toluene were combined in a 100 ml Wheaton CELSTI™. The stirring rate was set to 450 rpm. 10.0 g of silica-2 was slowly added to the CELSTIR™. The resulting slurry was allowed to stir at room temperature for 15 minutes. Then the CELSTIR™ was placed in a sand bath heated to 100° C. The slurry was heated at 100° C. for an additional 3 hrs. at a stirring rate of 250 rpm. The final slurry was filtered through a 110 ml Optichem disposable polyethylene frit. The solid collected in the frit was first rinsed with 40 g toluene for 3 times, then 40 g pentane for 3 times. The solid was dried in vacuo for 16 hrs. 12.9 g of sMAOsilica-2 was obtained.

c) sMAO from Silica-3

In a drybox, 45.1 g MAO toluene solution (Albermarle, 13.6 wt % Al) and 120 g of anhydrous toluene were combined in a 250 ml Wheaton CELSTIR™. The stirring rate was set to 500 rpm. 36.0 g of silica-3 was slowly added to the CELSTIR™ in 5 g increments. The resulting slurry was allowed to stir at room temperature for 15 minutes. Then the CELSTIR™ was placed in a sand bath heated to 100° C. The slurry was heated at 100° C. for an additional 3 hrs. at a stirring rate of 200 rpm. The final slurry was filtered through a 110 ml Optichem disposable polyethylene frit. The solid collected in the frit was first rinsed with 120 g toluene, then 80 g pentane for 2 times. The solid was dried in vacuo for 16 hours. 49.7 g of sMAO-silica-3 was obtained.

d) sMAO from Silica-4

In a drybox, 2.0 g silica-4 and 8.0 g of anhydrous toluene were combined in a 25 ml Wheaton CELSTIR™. The stirring rate was set to 500 rpm. 2.4 g MAO toluene solution (Albermarle, 13.6 wt % Al) was slowly added to the CELSTIR™. The resulting slurry was allowed to stir at room temperature for 15 minutes. Then the CELSTIR™ was placed in a sand bath heated to 80° C. The slurry was heated at 80° C. for an additional 1 hour at a stirring rate of 300 rpm. The final slurry was filtered through a 25 ml Optichem disposable polyethylene frit. The solid collected in the frit was first rinsed with 6 g toluene for 3 times, then 6 g pentane for 3 times. The solid was dried in vacuo for 45 mins. 2.56 g of sMAO-silica-4 was obtained.

e) sMAO from Silica-5

In a drybox, 2.8 g MAO toluene solution (Albermarle, 13.6 wt % Al) and 8.5 g of anhydrous toluene were combined in a 25 ml Wheaton CELSTIR™. The stirring rate was set to 450 rpm. 1.98 g of silica-5 was slowly added to the CELSTIR™. The resulting slurry was allowed to stir at room temperature for 5 minutes. Then the CELSTIR™ was placed in a sand bath heated to 100° C. The slurry was heated at 100° C. for an additional 1 hour at a stirring rate of 285 rpm. The final slurry was filtered through a 25 ml Optichem disposable polyethylene frit. The solid collected in the frit was first rinsed with 6 g toluene for 2 times, then 4.5 g pentane for 3 times. The solid was dried in vacuo for 2 hrs. 2.80 g of sMAO-silica-5 was obtained.

f) Comparative Example 1: sMAO-D948-200 from D948 Silica Calcined at 200° C.

200° C. calcined D948 silica (1.01 g) was slurried in 6 g of toluene in a 25 ml Wheaton CELSTIR™. The CELSTIR™ was then heated to 100° C. in a sand bath before 3.0 g MAO toluene solution (Albermarle, 13.6 wt % Al) was added slowly to the slurry. The slurry was stirred at 100° C. for 1 hr. The slurry was filtered, washed three times with 6 g of toluene for 3 times and 6 g of pentane for 2 times. The solid was dried under vacuum for 45 mins. o to give a 1.46 g amount of free flowing white solid "sMAO-D948-200".

g) Comparative Example 2: sMAO from D948 Silica Calcined at 600° C.

600° C. calcined 948 silica (40.7 g) was slurried in 200 mL of toluene. MAO (71.4 g of a 30 wt % toluene solution, 351.1 mmol of Al) was added slowly to the slurry. The slurry was then heated to 80° C. and stirred for 1 hr. The slurry was filtered, washed three times with 70 mL of toluene and once with pentane. The solid was dried under vacuum overnight to give a 60.7 g amount of free flowing white solid "sMAO-D948-600".

Preparation of Supported Bridged Monocyclopentadienyl Titanium Compounds.

Small-Scale Preparation of Supported Catalyst for High Throughput Experiment

Representative Procedure: (Support: sMAO-silica-3; Catalyst A)

In a 20 ml glass vial in the drybox were combined 20 mg Catalyst A and 2.28 g toluene. The mixture was vortexed for 10 min. to yield a stock solution. In another 20 ml glass vial weighed 0.492 g sMAO-silica-3. Added 2.0 g toluene to the vial, followed by 1.00 g Catalyst A/toluene stock solution. The vial was sealed with a Teflon-lined cap and vortexed at room temperature for 90 min. The resulting slurry was filtered through a 25 ml Optichem disposable polyethylene frit. The collected solid was rinsed with 3 g of toluene for 3 times, and 2 g of pentane for 3 times. The solid was then dried in vacuo. 0.466 g of supported Catalyst A on sMAO-silica-3 was obtained.

50 Gram-Scale Preparation of Supported Catalyst

Representative Procedure: (Support: sMAO-Silica-2; Catalyst A)

In a drybox, 44.6 g MAO toluene solution (Albermarle, 13.6 wt % Al) and 140 g of anhydrous toluene were combined in a 250 ml Wheaton CELSTIR™. The stirring rate was set to 500 rpm. 34.66 g of sMAO-silica-2 was slowly added to the CELSTIR™ in 5 g increments. The resulting slurry was allowed to stir at room temperature for 15 minutes. Then the CELSTIR™ was placed in a sand bath heated to 100° C. The slurry was heated at 100° C. for an additional 3 hrs. at a stirring rate of 200 rpm. The final slurry was filtered through a 250 ml Optichem disposable polyethylene frit. The solid collected in the frit was transferred back to 250 ml Wheaton CELSTIR™ and slurried in 130 g toluene. 0.767 g of Catalyst A (1.75 mmol) was added to the CELSTIR™ and the mixture was allowed to stir at room temperature for 90 min. The slurry was then filtered and washed three times with 120 g of toluene and 80 g pentane for 2 times. The solid was dried under vacuum for 16 hrs. to give 47.59 g of pale yellow, free-flowing powder.

Example 1: Ethylene/1-Hexene Copolymerization

High-Throughput Slurry-Phase Ethylene/Hexene Copolymerization Experiments.

Preparation of catalyst slurry for high throughput run: In a drybox, 45 mg of supported catalyst was weighed into a 20 ml glass vial. 15 ml of toluene was added to the vial to make a slurry that contained 3 mg supported catalyst/ml slurry. The resulting mixture was vortexed prior to injection.

Starting material preparations: Solvents, polymerization grade toluene and isohexane were supplied by ExxonMobil Chemical Company and thoroughly dried and degassed prior to use. Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TnOAl (tri-n-octylaluminum, neat) was used as a 2 mmol/L solution in toluene.

Reactor Description and Preparation:

Polymerizations were conducted in an inert atmosphere ($N_2$) drybox using autoclaves equipped with an external heater for temperature control, glass inserts (internal volume of reactor=22.5 mL), septum inlets, regulated supply of nitrogen, ethylene and hexene, and equipped with disposable PEEK mechanical stirrers (800 RPM). The autoclaves were prepared by purging with dry nitrogen prior to use.

Ethylene/1-Hexene Copolymerization:

The reactor was prepared as described above, and then purged with ethylene. Isohexane, 1-hexene and TnOAl were added via syringe at room temperature and atmospheric pressure. The reactor was then brought to process temperature (85° C.) and charged with ethylene to process pressure (130 psig=896 kPa) while stirring at 800 RPM. The transition metal compound (100 μL of a 3 mg/mL toluene slurry, unless indicated otherwise) was added via syringe with the reactor at process conditions. TnOAl was used as 200 μL of a 20 mmol/L in isohexane solution. Amounts of reagents not specified above are given in Table 1. No other reagent was used. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi O2/Ar (5 mol % O2) gas mixture to the autoclaves for approximately 30 seconds. The polymerizations were quenched after a predetermined cumulative amount of ethylene had been added or for a maximum of 45 minutes polymerization time. In addition to the quench time for each run. The reactors were cooled and vented. The polymer was isolated after the solvent was removed in vacuo. Yields reported include total weight of polymer and residual catalyst. Catalyst activity is reported as kilograms of polymer per mmol transition metal compound per hour of reaction time (kg/mmol·hr). (Data in TABLE 1).

TABLE 1

HTPT Evaluation of supported Catalyst A-D in slurry ethylene/1-hexene polymerization: activity, Mw, PDI and 1-hexene incorporation capability. Run condition: isohexane as solvent, 85° C., 130 psi ethylene pressure, 30 μl (6 mol % in feed) 1-hexene, no hydrogen added.

| Catalyst | Support | Catalyst A loading (μmol/g sMAO) | Average Activity (kg/mol * h) | Mw (kg/mol) | Mw/Mn | wt % C6 |
|---|---|---|---|---|---|---|
| A | sMAO-D948-200 | 40 | 2416 | 2416 | 4.0 | 7.8 |
|   | sMAO-D948-600 | 40 | 5555 | 3039 | 2.8 | 7.4 |
|   | sMAO-Silica-5 | 40 | 5554 | 2580 | 3.6 | 5.2 |
|   | sMAO-Silica-3 | 41 | 7914 | 2633 | 2.5 | 3.8 |
|   | sMAO-Silica-4 | 39 | 2697 | 2824 | 2.8 | 7.0 |
|   | sMAO-Silica-2 | 40 | 5493 |   |   |   |
|   | sMAO-Silica-1 | 40 | 7664 | 3147 | 2.6 | 5.7 |
| B | sMAO-D948-600 | 43 | 11012 | 2263 | 2.6 | 5.0 |
|   | sMAO-Silica-3 | 44 | 14321 | 2034 | 2.5 | 4.8 |
|   | sMAO-Silica-2 | 38 | 7885 | 1937 | 2.3 | 5.1 |
| C | sMAO-D948-600 | 40 | 15389 | 1910 | 2.8 | 4.1 |
|   | sMAO-Silica-3 | 30 | 21816 | 1984 | 2.7 | 4.4 |
|   | sMAO-Silica-2 | 43 | 17424 | 1992 | 2.0 | 4.7 |
| D | sMAO-Silica-3 | 37 | 7480 | 2637 | 2.4 | 4.4 |

Table 1 shows bridged monocyclopentadienyl titanium compounds A-D supported on sMAO-Silica-3 gave good to excellent activities. The produced PE resins have ultra-high Mw, slightly broadened Mw/Mn, and high comonomer incorporations.

Example 2: Gas Phase Polymerization with Supported Bridged Monocyclopentadienyl Titanium Compounds A-C Polymerization was performed in a gas-phase fluidized bed reactor with a 6" body and a 10" expanded section. Cycle and feed gases were fed into the reactor body through a perforated distributor plate, and the reactor was controlled at 300 psi and 70 mol % ethylene. Reactor temperature was maintained by heating the cycle gas. Supported catalyst was fed as a 10 wt % slurry in Sono Jell® from Sonneborn (Parsippany, N.J.). The slurry was thinned and delivered to the reactor by nitrogen and isopentane feeds in the catalyst probe. Products were collected from the reactor as necessary to maintain the desired bed weight. Average process conditions are listed in Table 3.

TABLE 3

Average process conditions for supported Catalyst A-C in Gas Phase Polymerization.

| | Catalyst | | |
|---|---|---|---|
| | A | B | C |
| Support | sMAO-Silica-2 | sMAO-Silica-2 | sMAO-Silica-2 |
| Temperature (° C.) | 85 | 85 | 85 |
| Pressure (psi) | 300 | 300 | 300 |
| Ethylene (mol %) | 70.0 | 70.0 | 70.0 |
| Hydrogen (ppm) | 1931 | 1200 | 1487 |
| Hexene (mol %) | | | |
| Bed Weight (g) | 1424 | 1951 | 1373 |
| Residence Time (hr) | 6.1 | 3.4 | 2.7 |
| Cycle Gas Velocity (ft/s) | 1.47 | 1.56 | 1.50 |
| Production Rate (g/hr) | 233 | 572 | 516 |
| Activity ($g_{poly}/g_{supported\ cat}$) | 777 | 2772 | 1568 |
| Catalyst Slurry Feed (cc/hr) | 3.4 | 2.3 | 3.7 |
| MI I2.1 (g/10 min) | 0.38 | 1.50 | 2.55 |
| HLMI I21 (g/10 min) | 12.66 | 39.73 | 64.87 |
| MIR (I21/I2.1) | 33.40 | 26.48 | 25.44 |
| Density (g/cm$^3$) | 0.9257 | 0.9242 | 0.9304 |
| Bulk Density (g/cc) | 0.4260 | 0.4279 | 0.4433 |
| Mw of PE (g/mol) GPC | 145387 | 98711 | 85427 |
| Mw/Mn | 4.37 | 5.67 | 5.38 |
| Wt % of C6 (SCB) GPC | 5.24 | 6.72 | 5.24 |
| g'vis (LCB) GPC | 0.942 | 0.963 | 0.942 |

Melt index (MI) also referred to as I2, reported in g/10 min, is determined according to ASTM 1238, 190° C., 2.16 kg load.
High load melt index (HLMI) also referred to as I21, reported in g/10 min, is determined according to ASTM 1238, 190° C., 21.6 kg load.
Melt index ratio (MIR) is MI divided by HLMI as determined by ASTM 1238.
Density is determined according to ASTM D 1505.
Bulk Density is measured according to ASTM D1895.

The MI, HLMI, MIR and density data in the tables are averaged numbers based on several measurements.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa. Likewise, the terms "comprising," "consisting essentially of," "consisting of" also include the product of the combinations of elements listed after the term.

What is claimed is:

1. A catalyst system comprising the reaction product of a fluorided silica support, an alkylalumoxane activator, and a bridged monocyclopentadienyl group 4 transition metal compound, wherein the fluorided silica support has been calcined at a temperature of 100° C. to less than 400° C., wherein the fluorided silica support is prepared by combining a silica support with a fluoride compound in a polar solvent.

2. The catalyst system of claim 1, wherein the bridged monocyclopentadienyl group 4 transition metal compound is represented by the formula:

$T_yCp_mMG_nX_q$ wherein each Cp is, independently, a cyclopentadienyl group which is optionally substituted or unsubstituted, M is a group 4 transition metal, G is a heteroatom group represented by the formula JR*$_z$, wherein J is N, P, O, or S, R* is a $C_1$ to $C_{20}$ hydrocarbyl group, and z is 1 or 2, and wherein T is a bridging group, y is 1, X is a leaving group, m is 1, n is 1, 2, or 3, q is 1, 2, or 3, and the sum of m+n+q is equal to the oxidation state of the group 4 transition metal.

3. The catalyst system of claim 2, wherein M is Ti.

4. The catalyst system of claim 2, wherein each Cp is a cyclopentadienyl, indenyl or fluorenyl, which is optionally substituted or unsubstituted, M is titanium, and each X is, independently, a halide, a hydride, an alkyl group, an alkenyl group or an arylalkyl group.

5. The catalyst system of claim 1, wherein the alkylalumoxane activator comprises a non-coordinating anion activator.

6. The catalyst system of claim 1, wherein the alkylalumoxane activator comprises methylalumoxane.

7. The catalyst system of claim 2, wherein J is nitrogen and R* is methyl, ethyl, propyl, butyl, pentyl, hexyl, heptyl, octyl, nonyl, cyclooctyl, cyclododecyl, decyl, undecyl, dodecyl, adamantyl, or an isomer thereof.

8. The catalyst system of claim 1, wherein the bridged monocyclopentadienyl group 4 transition metal compound comprises one or more of:
dimethylsilyl (tetramethylcyclopentadienyl)(cyclododecylamido)titanium dimethyl,
dimethylsilyl (tetramethylcyclopentadienyl)(cyclododecylamido)titanium dichloride,
dimethylsilyl (tetramethylcyclopentadienyl)(t-butylamido)titanium dimethyl,
dimethylsilyl (tetramethylcyclopentadienyl)(t-butylamido)titanium dichloride,
μ-(CH$_3$)$_2$Si(cyclopentadienyl)(1-adamantylamido)M(R)$_2$;

μ-(CH$_3$)$_2$Si(3-tertbutylcyclopentadienyl)(1-adamantylamido)M(R)$_2$;

μ-(CH$_3$)$_2$(tetramethylcyclopentadienyl)(1-adamantylamido)M(R)$_2$;

μ-(CH$_3$)$_2$Si(tetramethylcyclopentadienyl)(1-adamantylamido)M(R)$_2$;

μ-(CH$_3$)$_2$C(tetramethylcyclopentadienyl)(1-adamantylamido)M(R)$_2$;

μ-(CH$_3$)$_2$Si(tetramethylcyclopentadienyl)(1-tertbutylamido)M(R)$_2$;

μ-(CH$_3$)$_2$Si(fluorenyl)(1-tertbutylamido)M(R)$_2$;

μ-(CH$_3$)$_2$Si(tetramethylcyclopentadienyl)(1-cyclododecylamido)M(R)$_2$;

μ-(C$_6$H$_5$)$_2$C(tetramethylcyclopentadienyl)(1-cyclododecylamido)M(R)$_2$;

μ-(CH$_3$)$_2$Si(η$^5$-2,6,6-trimethyl-1,5,6,7-tetrahydro-s-indacen-1-yl)(tertbutylamido)M(R)$_2$;

wherein M is selected from a group consisting of Ti, Zr, and Hf and R is selected from halogen or C1 to C5 alkyl.

9. The catalyst system of claim 2, wherein the sum of m+n+q is equal to 2, 3, or 4, and wherein J is nitrogen or oxygen, and R* is selected from methyl, ethyl, propyl, butyl, pentyl, hexyl, heptyl, octyl, nonyl, decyl, undecyl, dodecyl or an isomer thereof.

10. A process to produce ethylene polymer comprising: i) contacting, in the gas phase or slurry phase, ethylene and, optionally, a C$_3$ to C$_{20}$ comonomer, with a catalyst system comprising a fluorided silica support, an alkylalumoxane activator, and a bridged monocyclopentadienyl group 4 transition metal compound, wherein the fluorided silica support has been calcined at a temperature of 100° C. to less than 400° C., and wherein the fluorided silica support is prepared by combining a silica support with a fluoride compound in a polar solvent, and ii) obtaining an ethylene polymer comprising at least 50 mol % of ethylene.

11. The process of claim 10, wherein the ethylene polymer comprises ethylene and at least one C$_3$ to C$_{20}$ comonomer and has a bi-modal composition distribution.

12. The process of claim 10, wherein the ethylene polymer has a multimodal molecular weight distribution as determined by Gel Permeation Chromatography.

13. The process of claim 10, wherein the catalyst system is prepared by a process comprising combining the fluoride compound with the polar solvent to produce a fluoride compound solution, then combining the fluoride compound solution with a slurry of a silica support in a non-polar solvent, absorbing the fluoride compound onto a surface of the silica support, removing the non-polar solvent, calcining the silica support comprising the fluoride compound absorbed onto the surface thereof, thereafter combining the Page 4 of 11 calcined silica support with a second solvent, which is optionally the same as or different from the non-polar solvent, the bridged monocyclopentadienyl group 4 transition metal compound, and the alkylalumoxane activator, wherein the fluorided support is calcined at the temperature of 100° C. to less than 400° C., before or after combination with the alkylalumoxane activator and/or the bridged monocyclopentadienyl group 4 transition metal compound.

14. The process of claim 13, wherein the polar solvent is water and the ratio (by weight) of water to non-polar solvent is between 1:10 to 1:1,000.

15. The process of claim 13 or claim 14, wherein the non-polar solvent is toluene, pentane, hexane, benzene, or chloroform.

16. The process of claim 10, wherein the fluoride compound is one or more of NH$_4$BF$_4$, (NH$_4$)$_2$SiF$_6$, NH$_4$PF$_6$, NH$_4$F, (NH$_4$)$_2$TaF$_7$, NH$_4$NbF$_4$, (NH$_4$)$_2$GeF$_6$, (NH$_4$)$_2$SmF$_6$, (NH$_4$)$_2$TiF$_6$, (NH$_4$)$_2$ZrF$_6$, MoF$_6$, ReF$_6$, GaF$_3$, SO$_2$ClF, F$_2$, SiF$_4$, SF$_6$, ClF$_3$, ClF$_5$, BrF$_5$, IF$_7$, NF$_3$, HF, BF$_3$, NHF$_2$ and NH$_4$HF$_2$.

17. The process of claim 10, wherein the alkylalumoxane activator comprises methylalumoxane.

18. The process of claim 10, wherein the alkylalumoxane activator comprises a non-coordinating anion activator.

19. The process of claim 10, wherein the process occurs at a temperature of from about 0° C. to about 300° C., at a pressure in the range of from about 0.35 MPa to about 10 MPa, and for a period of time of up to 300 minutes.

20. The process of claim 10, wherein the comonomer is present and is selected from propylene, butene, pentene, hexene, heptene, octene, nonene, decene, undecene, dodecene or mixtures thereof.

21. The process of claim 10, wherein the catalyst system is prepared by a method comprising combining the fluoride compound with water to produce a fluoride compound solution, then combining the fluoride compound solution with a slurry of a silica support in a non-polar solvent, absorbing the fluoride compound onto a surface of the silica support, removing the non-polar solvent, calcining the silica support comprising the fluoride compound absorbed onto the surface thereof, thereafter combining the calcined support with a second solvent, which is optionally the same as or different from the non-polar solvent, two bridged monocyclopentadienyl group 4 transition metal compounds, and the alkylalumoxane activator, wherein the fluorided support is calcined at the temperature of 100° to less than 400° C., before or after combination with the alkyalumoxane activator and/or the two bridged monocyclopentadienyl group 4 transition metal compounds.

22. The process of claim 21 wherein the ratio (by weight) of water to the non-polar solvent is between 1:10 to 1:1000; the non-polar solvent is toluene, pentane, hexane, benzene, or chloroform; and the fluoride compound is one or more of NH$_4$BF$_4$, (NH$_4$)$_2$SiF$_6$, NH$_4$PF$_6$, NH$_4$F, (NH$_4$)$_2$TaF$_7$, NH$_4$NbF$_4$, (NH$_4$)$_2$GeF$_6$, (NH$_4$)$_2$SmF$_6$, (NH$_4$)$_2$TiF$_6$, (NH$_4$)$_2$ZrF$_6$, MoF$_6$, ReF$_6$, GaF$_3$, SO$_2$ClF, F$_2$, SiF$_4$, SF$_6$, ClF$_3$, ClF$_5$, BrF$_5$, IF$_7$, NF$_3$, HF, BF$_3$, NHF$_2$ and NH$_4$HF$_2$.

23. The catalyst system of claim 1, wherein the catalyst system is prepared by a process comprising combining the fluoride compound with the polar solvent to produce a fluoride compound solution, then combining the fluoride compound solution with a slurry of a silica support in a non-polar solvent, absorbing the fluoride compound onto a surface of the silica support, removing the non-polar solvent, calcining the silica support comprising the fluoride compound absorbed onto the surface thereof, thereafter combining the calcined silica support with a second solvent, which is optionally the same as or different from the non-polar solvent, the bridged monocyclopentadienyl group 4 transition metal compound, and the alkylalumoxane activator, wherein the fluorided support is calcined at the temperature of 100° C. to less than 400° C., before or after combination with the alkylalumoxane activator and/or the bridged monocyclopentadienyl group 4 transition metal compound.

24. The catalyst system of claim 1, wherein the bridged monocyclopentadienyl group 4 transition metal compound comprises μ-(CH$_3$)$_2$Si(η$^5$-2,6,6-trimethyl-1,5,6,7-tetrahydro-s-indacen-1-yl)(tertbutylamido)M(R)$_2$, wherein M is selected from the group consisting of Ti, Zr, and Hf, and wherein R is a halogen or a C1 to C5 alkyl.

25. The process of claim 10, wherein the bridged monocyclopentadienyl group 4 transition metal compound comprises µ-$(CH_3)_2$Si($\eta^5$-2,6,6-trimethyl-1,5,6,7-tetrahydro-s-indacen-1-yl)(tertbutylamido)M(R)$_2$, wherein M is selected from the group consisting of Ti, Zr, and Hf, and wherein R is a halogen or a C1 to C5 alkyl.

* * * * *